(12) United States Patent
Kishiyama et al.

(10) Patent No.: US 10,820,318 B2
(45) Date of Patent: Oct. 27, 2020

(54) USER TERMINAL, RADIO BASE STATION AND RADIO COMMUNICATION METHOD BASED UPON DOWNLINK CONTROL IN CURRENT SUBFRAME

(71) Applicant: NTT DOCOMO, INC., Tokyo (JP)

(72) Inventors: Yoshihisa Kishiyama, Tokyo (JP); Kazuki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/080,390

(22) PCT Filed: Feb. 27, 2017

(86) PCT No.: PCT/JP2017/007508
§ 371 (c)(1),
(2) Date: Aug. 28, 2018

(87) PCT Pub. No.: WO2017/150451
PCT Pub. Date: Sep. 8, 2017

(65) Prior Publication Data
US 2019/0069289 A1    Feb. 28, 2019

(30) Foreign Application Priority Data

Feb. 29, 2016 (JP) .................................. 2016-038175

(51) Int. Cl.
*H04W 72/04* (2009.01)
*H04W 72/12* (2009.01)
(Continued)

(52) U.S. Cl.
CPC ....... *H04W 72/0446* (2013.01); *H04L 5/0048* (2013.01); *H04W 24/10* (2013.01);
(Continued)

(58) Field of Classification Search
CPC ......... H04W 72/0446; H04W 74/0833; H04W 72/0406; H04W 88/08; H04W 88/02;
(Continued)

(56) References Cited

U.S. PATENT DOCUMENTS 10,085,256 B2 * 9/2018 Chen ................. H04W 72/0446
10,630,432 B2 * 4/2020 Kim .................. H04W 72/0473
(Continued)

OTHER PUBLICATIONS

International Search Report issued in PCT/JP2017/007508 dated Apr. 18, 2017 (2 pages).
(Continued)

*Primary Examiner* — Brian T O Connor
(74) *Attorney, Agent, or Firm* — Osha Liang LLP

(57) ABSTRACT

The present invention is designed so that adequate communication can be carried out even in future radio communication systems. A user terminal communicates using a transmission time interval (TTI), which has a predetermined TTI duration, and has a receiving section that receives a DL signal, a transmission section that transmits a UL signal, and a control section that controls at least one of transmission of a random access preamble, transmission of an SRS, reception of a broadcast channel and reception of a mobility reference signal, based on downlink control information that is included in the same TTI.

8 Claims, 17 Drawing Sheets

(51) Int. Cl.
  *H04W 24/10* (2009.01)
  *H04L 5/00* (2006.01)
  *H04W 74/08* (2009.01)
  *H04W 88/02* (2009.01)
  *H04W 88/08* (2009.01)

(52) U.S. Cl.
  CPC ....... *H04W 72/04* (2013.01); *H04W 72/0406* (2013.01); *H04W 72/12* (2013.01); *H04W 74/0833* (2013.01); *H04W 88/02* (2013.01); *H04W 88/08* (2013.01)

(58) Field of Classification Search
  CPC ..... H04W 72/12; H04W 72/04; H04W 24/10; H04L 5/0048
  See application file for complete search history.

(56) References Cited

U.S. PATENT DOCUMENTS

| | | | |
|---|---|---|---|
| 2014/0369242 A1 | 12/2014 | Ng et al. | |
| 2018/0184459 A1* | 6/2018 | Kim | H04L 5/00 |
| 2018/0270634 A1* | 9/2018 | Kim | H04W 48/00 |
| 2018/0302195 A1* | 10/2018 | Kim | H04L 1/18 |
| 2018/0324834 A1* | 11/2018 | Sebire | H04L 5/14 |
| 2018/0359745 A1* | 12/2018 | Yeo | H04L 1/18 |
| 2018/0376477 A1* | 12/2018 | Chen | H04W 72/0446 |
| 2019/0045487 A1* | 2/2019 | You | H04L 5/0007 |
| 2019/0150130 A1* | 5/2019 | Yang | H04B 7/26 |
| 2019/0174532 A1* | 6/2019 | Damnjanovic | H04W 72/14 |
| 2019/0223204 A1* | 7/2019 | Kim | H04W 72/12 |
| 2019/0239109 A1* | 8/2019 | Kim | H04L 5/0048 |
| 2020/0022156 A1* | 1/2020 | Kim | H04L 5/001 |
| 2020/0037306 A1* | 1/2020 | Seo | H04W 76/14 |

OTHER PUBLICATIONS

Written Opinion of the International Searching Authority issued in PCT/JP2017/007508 dated Apr. 18, 2017 (4 pages).

Ericsson; "DCI bit fields for short TTI uplink transmissions"; 3GPP TSG RAN WG1 Meeting #84, R1-160941; Malta; Feb. 15-19, 2016 (5 pages).

Ericsson; "DCI for short TTI uplink transmissions"; 3GPP TSG RAN WG1 Meeting #84, R1-160938; Malta; Feb. 15-19, 2016 (8 pages).

ETRI; "Discussion on TTI shortening"; 3GPP TSG RAN WG1 Meeting #83, R1-157110; Anaheim, USA; Nov. 16-20, 2015 (7 pages).

LG Electronics; "Study on TTI shortening for downlink transmissions"; 3GPP TSG RAN WG1 Meeting #84, R1-160649; St Julian's, Malta; Feb. 15-19, 2016 (7 pages).

ETRI; "Overview on uplink design for TTI shortening"; 3GPP TSG RAN WG1 Meeting #84, R1-161012; Malta; Feb. 15-19, 2016 (5 pages).

3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).

Extended European Search Report issued in counterpart European Patent Application No. 17759917.2, dated Jul. 29, 2019 (8 Pages).

Office Action issued in European Application No. 17759917.2, dated Jul. 9, 2020 (4 pages).

* cited by examiner

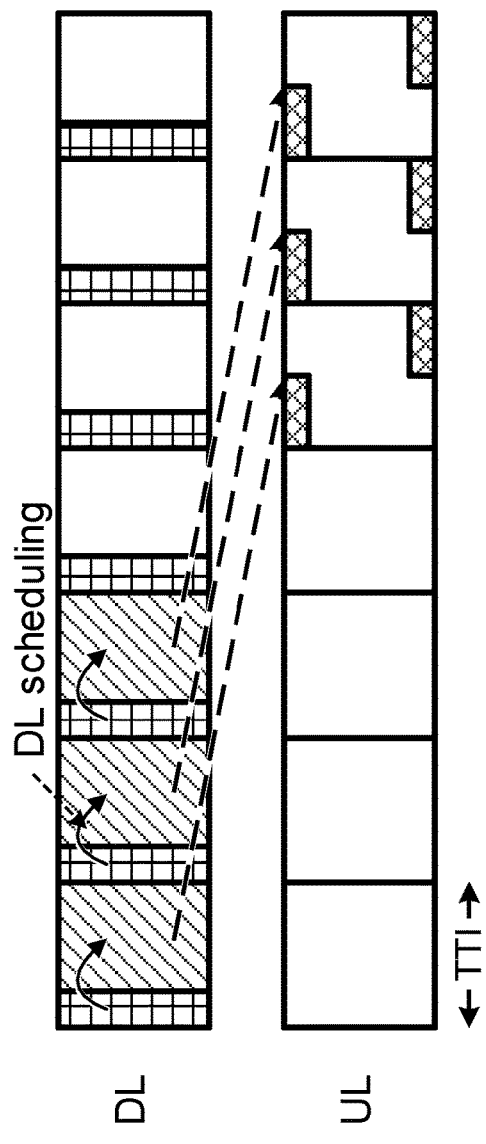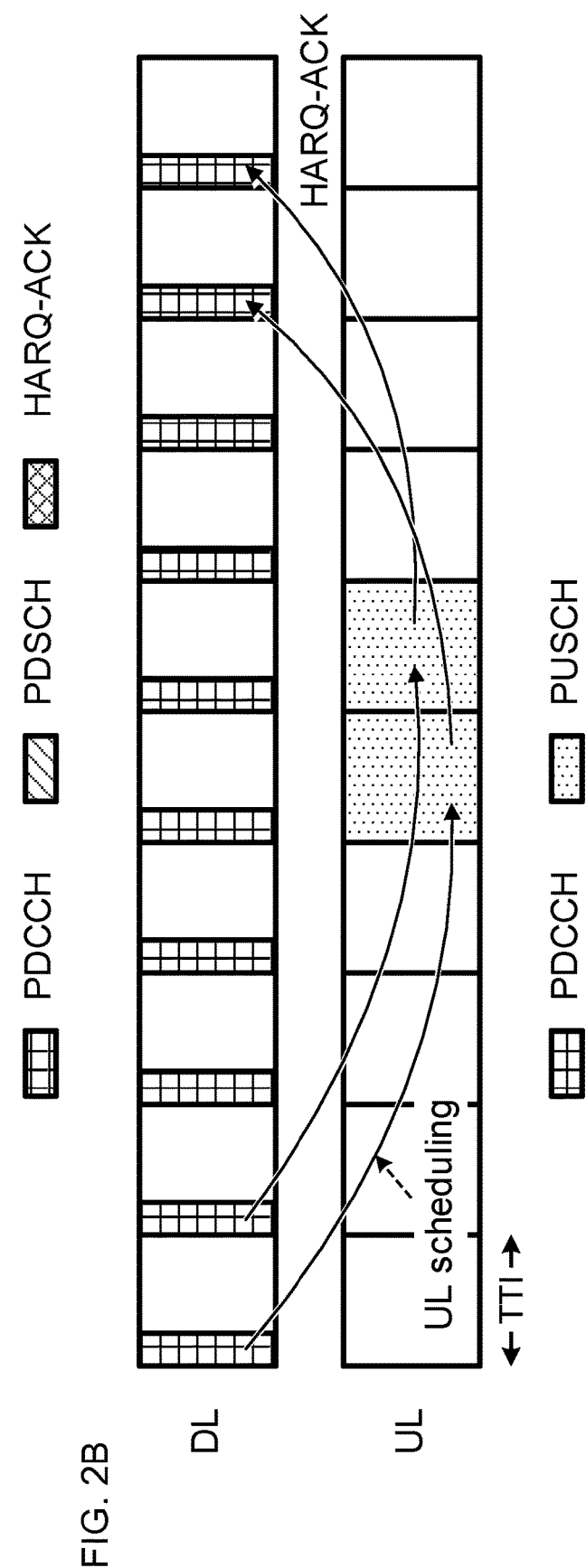

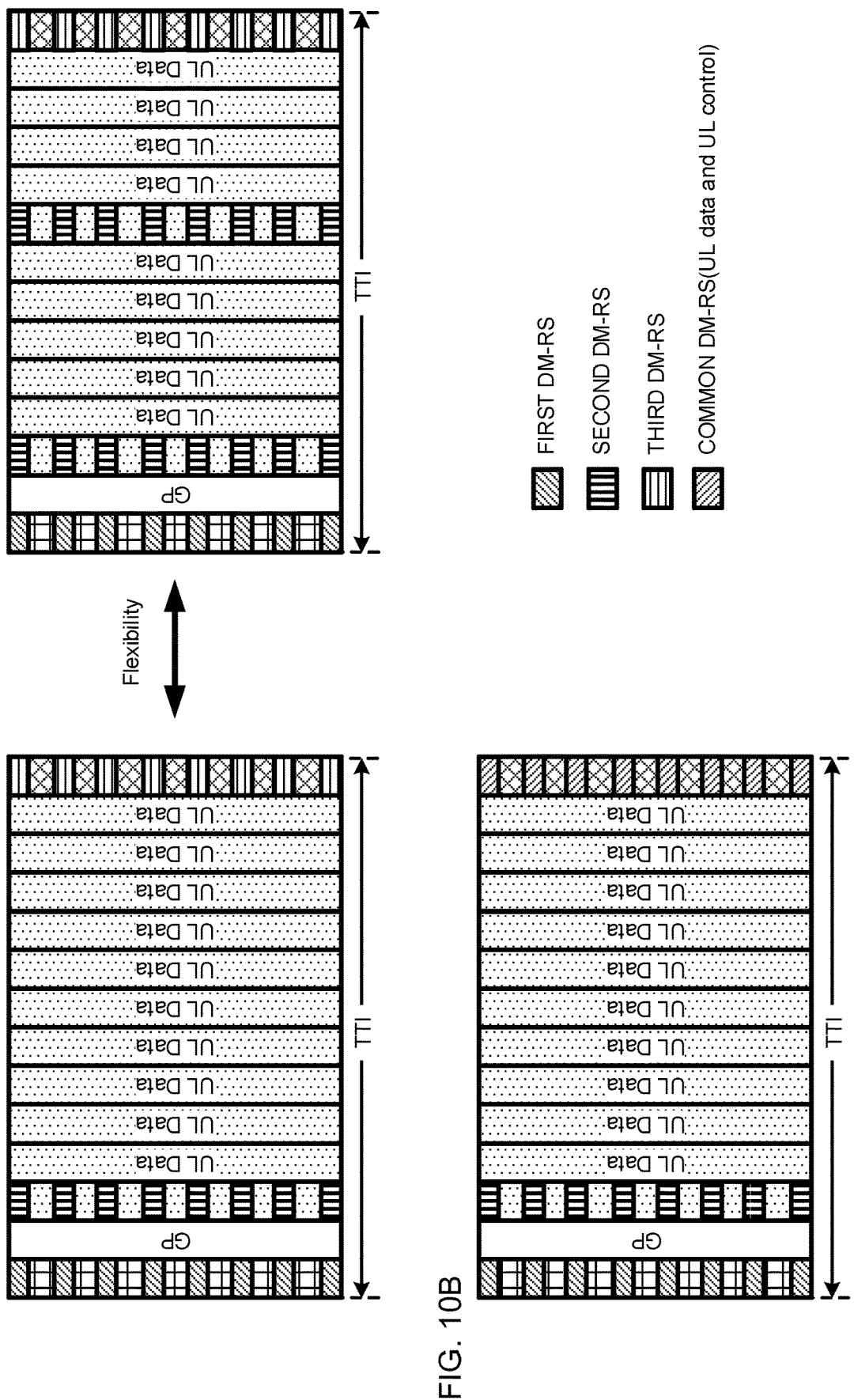

USER TERMINAL, RADIO BASE STATION AND RADIO COMMUNICATION METHOD BASED UPON DOWNLINK CONTROL IN CURRENT SUBFRAME

TECHNICAL FIELD

The present invention relates to a user terminal, a radio base station and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). In addition, successor systems of LTE (referred to as, for example, "LTE-A" (LTE-Advanced), "FRA" (Future Radio Access), "5G" (5th generation mobile communication system) and so on) are also under study for the purpose of achieving further broadbandization and increased speed beyond LTE.

Existing LTE systems use control based on TDD (Time Division Duplex) and FDD (Frequency Division Duplex). For example, in TDD, whether to use each subframe in the uplink (UL) or in the downlink (DL) is strictly determined based on the UL/DL configuration.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

By the way, in the radio communication systems of LTE Rel. 13 or later versions (for example, 5G), radio frames (lean radio frame) that have good future scalability and that achieve excellent power saving performance are under study. Such radio frames need to be configured so that signals are transmitted as collectively as possible in a short time and no communication is made when there is no data to be transmitted or received. For example, in future radio communication systems, it is anticipated to construct radio frames that can realize feedback with very low delay, preferably one ms or less.

However, in existing LTE systems, communication timing is controlled on a per subframe (one ms) basis. Therefore, even if signal transmission/reception methods used in existing LTE systems are applied on an as-is basis, it is difficult to communicate by satisfying the requirements of future radio communication systems.

The present invention has been made in view of the above, and it is therefore an object of the present invention to provide a user terminal, a radio base station and a radio communication method, whereby adequate communication can be carried out even in future radio communication systems.

Solution to Problem

According to one aspect of the present invention, a user terminal communicates using a transmission time interval (TTI), which has a predetermined TTI duration, and has a receiving section that receives a DL signal, a transmission section that transmits a UL signal, and a control section that controls at least one of transmission of a random access preamble, transmission of an SRS, reception of a broadcast channel and reception of a mobility reference signal, based on downlink control information that is included in the same TTI.

Advantageous Effects of Invention

According to the present invention, adequate communication can be carried out even in future radio communication systems.

BRIEF DESCRIPTION OF DRAWINGS

FIGS. 2A and 2B provide diagrams to show examples of HARQ-ACK timings in existing LTE systems;

FIGS. 10A and 10B are diagrams to show examples of UL reference signal allocation methods;

DESCRIPTION OF EMBODIMENTS

In existing LTE systems (Rel. 8 to 12), a radio base station (eNB: evolved Node B) schedules data transmission/reception for a user terminal (UE: User Equipment) by using a downlink control channel. To be more specific, DL scheduling and UL scheduling based on downlink control information (DCI) reported in the PDCCH (Physical Downlink Control Channel)/EPDCCH (Enhanced PDCCH) are stipulated.

Figure 1:
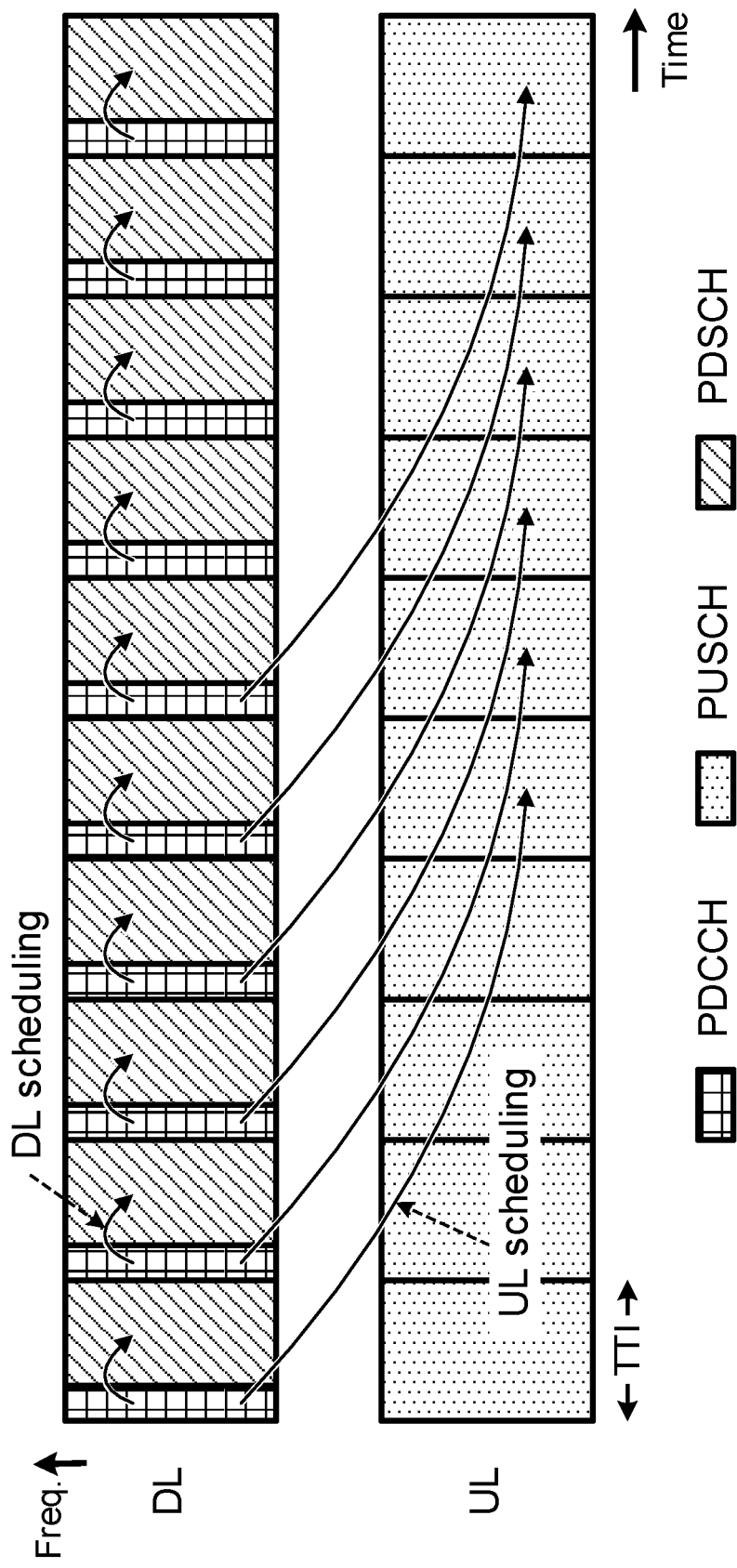
FIG. 1 is a diagram to show an example of data scheduling in existing LTE systems.

FIG. 1 is a diagram to show an example of data scheduling in existing LTE systems. In FIG. 1, DL scheduling and UL scheduling commanded in DCI received in the PDCCH are shown. As shown in FIG. 1, when a DL grant (also referred to as a "DL assignment" (downlink assignment)) according to, for example, DCI format 1A is detected in a subframe, the UE receives a PDSCH (Physical Downlink Shared Channel), based on this DL grant, in the same subframe.

Further, when a UL grant according to DCI format 0/4 is detected in a subframe, the UE transmits a PUSCH (Physical Uplink Shared Channel), based on this UL grant, in a subframe that comes a predetermined period later (for example, four subframes later).

Note that the downlink control information for scheduling the transmission of uplink data is referred to as "UL grant" (also referred to as "uplink scheduling information," "uplink scheduling control information," etc.) and the downlink control information for scheduling the reception of downlink data (also referred to as "downlink scheduling information," "downlink scheduling control information," etc.) is referred to as "DL grant," but these designations are not by no means limiting. Furthermore, downlink control information (downlink control signals) may be referred to as, for example, "L1/L2 (Layer 1/Layer 2) control information" (L1/L2 control signal), or may be simply referred to as "L1 control information" (L1 control signal).

Furthermore, a subframe may be referred to as a "transmission time interval" (TTI). A TTI (subframe) according to LTE Rel. 8 to 12 is one ms long, and comprised of two time slots. A TTI is a channel-coded data packet (transport block) transmission time unit, and is the processing unit in scheduling, link adaptation, etc.

Although FIG. 1 shows an example of reporting UL/DL grants in the PDCCH, the correspondence between scheduling TTIs and scheduled TTIs is the same as in FIG. 1 also in the case of the EPDCCH. Also, DL grants and the PDSCH need not be transmitted and received in the same carrier (component carrier (CC), cell, etc.), and can be transmitted and received in different carriers. Furthermore, UL grants and the PUSCH need not be transmitted and received in the same carrier, and can be transmitted and received in different carriers.

In addition, existing LTE systems uses control based on TDD (Time Division Duplex) and FDD (Frequency Division Duplex). To be more specific, it is strictly stipulated whether to use the time/frequency resources for the DL or for the UL per predetermined unit (here, for example, the time resources are subframes, and the frequency resources are CCs).

Further, HARQ (Hybrid Automatic Repeat reQuest)-based retransmission control is used in existing LTE systems. In HARQ, the transmitting side can decide whether to retransmit data or to transmit new data based on delivery acknowledgment information that is fed back from the receiving side (also referred to as, for example, "retransmission control information," "HARQ-ACKs," "ACKs/NACKs" (A/Ns: Acknowledgments/Negative-Acknowledgments), etc.).

Note that the delivery acknowledgment information may be reported by way of not sending ACKs/NACKs (discontinuous transmission (DTX)). That is, if the recipient cannot detect an ACK/NACK from the sender (UE or eNB), the recipient (eNB or UE) can interpret that the delivery acknowledgment information in response to the corresponding data is a NACK.

In existing LTE systems, the timings at which the UE transmits/receives HARQ-ACKs in response to data are stipulated. FIG. 2 provide diagrams to show examples of HARQ-ACK timings in existing LTE systems. FIG. 2A shows the HARQ-ACK transmission timing corresponding to the DL grant-based DL scheduling. The UE transmits an HARQ-ACK in principle four subframes or more after receiving a PDSCH. As shown in FIG. 2A, HARQ-ACKs may support frequency hopping.

FIG. 2B shows HARQ-ACK transmission timings in accordance with UL grant-based UL scheduling. The UE receives an HARQ-ACK in principle four subframes or more after transmitting a PUSCH.

Now, in the radio communication systems of LTE Rel. 13 or later versions (for example, 5G), radio frames (lean radio frame) that have good future scalability and that achieve excellent power saving performance are under study. For example, a lean radio frame is one such radio frame. A system using a lean radio frame needs to be constructed so that signals are transmitted as collectively as possible in a short time and no communication is made when there is no data to be transmitted or received.

Meanwhile, in existing LTE systems, the timing of communication is controlled on a per subframe (one ms) basis. Therefore, even if signal transmission/reception methods used in existing LTE systems are applied to future systems on an as-is basis, it is difficult to realize lean radio frames.

Therefore, the present inventors have found out that a radio frame configuration with excellent power saving performance can be realized by allocating and controlling predetermined DL signals (DL channels) and/or predetermined UL signals (UL channels) more dynamically (or more semi-dynamically) than in existing LTE systems.

For example, control may be performed so that signals (channels) that are statically allocated in existing LTE systems are dynamically or semi-dynamically allocated. Alternatively, control may be performed so that signals (channels) that are semi-statically allocated in existing LTE systems are dynamically allocated. This makes it possible to avoid situations where signals are always allocated (or allocated over a long period), and signals can be assigned in a short period of time. As a result of this, increase in power consumption can be suppressed, and delay can be reduced.

Assigning signals dynamically here refers to controlling transmission and reception by assigning multiple signals (channels) to the same TTI. For example, communication can be controlled by multiplexing a DL signal and/or a UL signal, and a control signal for controlling the transmission and reception of these DL signal and/or UL signal, in the same transmission time interval (TTI). Also, semi-dynamically allocating signals refers to controlling communication by multiplexing a DL signal and/or a UL signal and a control signal for controlling the transmission and reception of the DL signal and/or the UL signal in TTIs that are separated by a predetermined period (a length of multiple TTIs). If shortened TTIs with a TTI duration shorter than one ms are used, the predetermined period may be configured to one ms.

Now, embodiments of the present invention will be described below in detail with reference to the accompanying drawings. Note that the radio communication methods of the above-described embodiments may be applied individually or may be applied in combination.

Further, a subframe (TTI) in the following embodiments may be a subframe used in existing LTE (one ms), may be a period shorter than one ms (for example, 1 to 13 symbols), or may be a period longer than one ms.

<Lean Radio Frame>

Figure 3A:
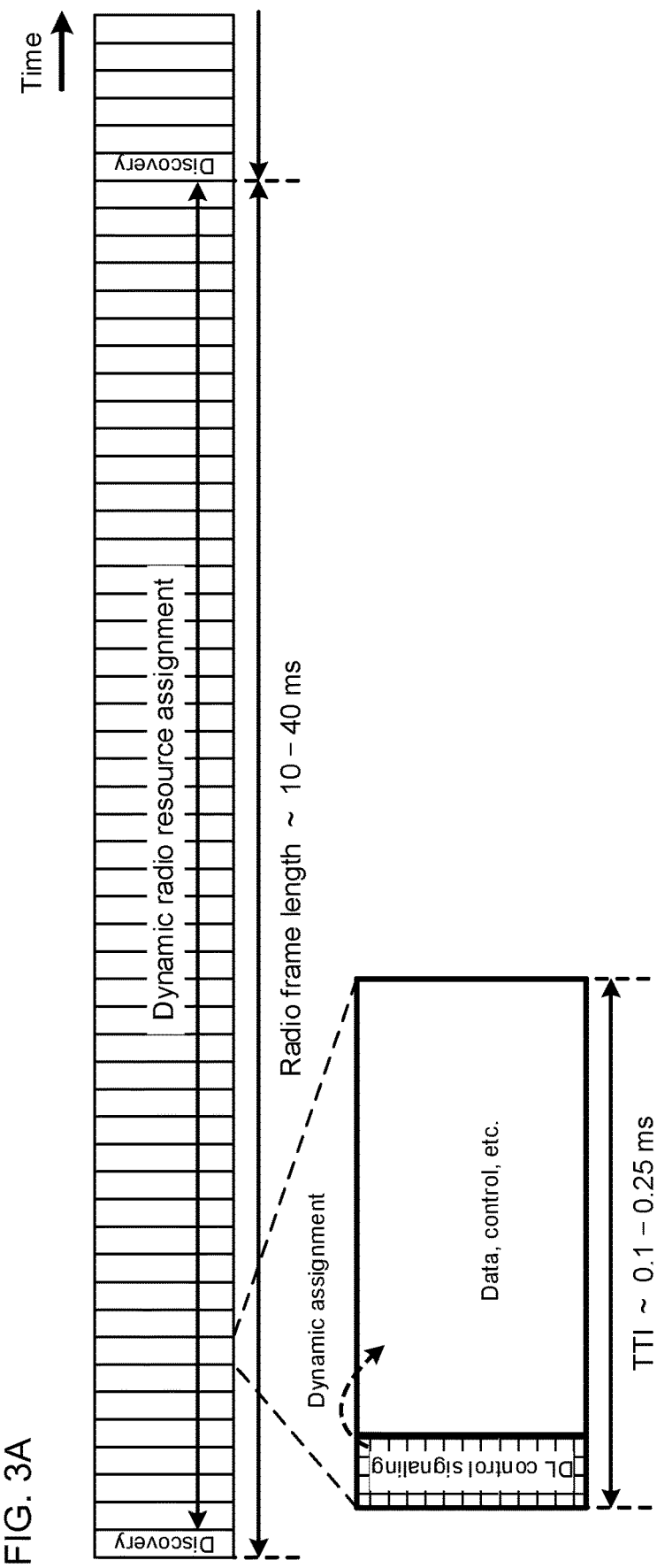
FIGS. 3A and 3B are diagrams to show examples of configurations of lean radio frames.
Figure 3B:
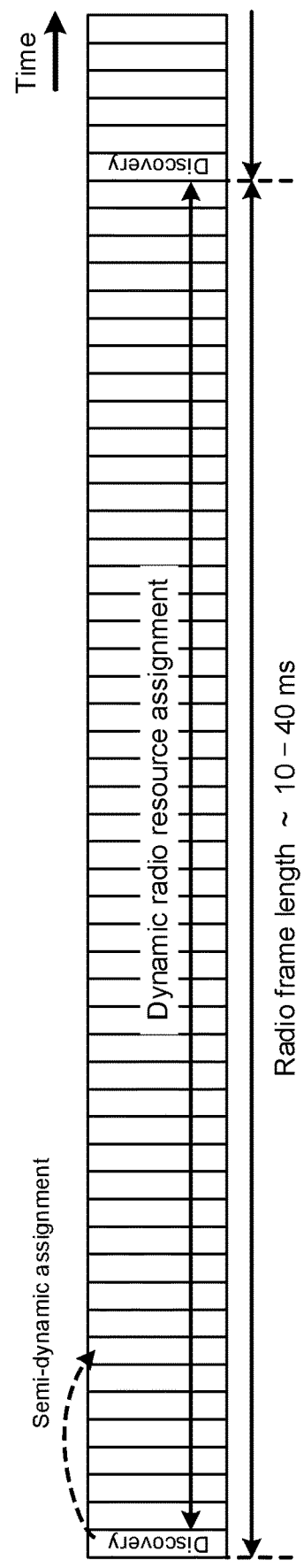

FIG. 3 provide diagrams to show examples of lean radio frame configurations. FIG. 3A shows an example of dynamic allocation (for example, scheduling in TTI units). In addition, FIG. 3B shows an example of semi-static allocation (for example, scheduling in radio frame units or scheduling in multiple-TTI units).

In FIG. 3A and FIG. 3B, the radio frame duration is configured to a predetermined length (for example, 10 to 40 ms). Also, in order to enable transmission/reception in a short time, for example, the TTIs are configured to 0.1 to 0.25 ms. Thus, TTIs that are shorter than the TTIs used in LTE Rel. 8 to 12 (TTIs that are one-ms long in time) may be referred to as "shortened TTIs." Note that the radio frame duration and the TTI duration are not limited to the examples of FIG. 3.

In carriers that use lean radio frames (which may be referred to as "lean carriers"), discovery/mobility control using low-overhead signals is supported. These signals may be referred to as "detection signals," "detection measurement signals," "mobility measurement signals," "discovery reference signals" (DRS), "discovery signals" (DS), or the like, for example.

The DS for lean radio frames may be formed by including at least one of synchronization signals (PSS (Primary Synchronization Signal)/SSS (Secondary Synchronization Signal)), a cell-specific reference signal (CRS) and a channel state information reference signal (CSI-RS). Note that the configuration of the DS is not limited to this, and the DS may be a signal obtained by modifying/enhancing an existing DS, or may be a signal including signals/information necessary for communication.

The UE attempts to receive the DS in the top TTI in each radio frame. For example, the UE may execute synchronization processing and/or measurements (for example, RRM (Radio Resource Management) measurements including RSRP (Reference Signal Received Power) measurement) based on the DS. A TTI in which the DS is transmitted may be referred to as a "discovery signal TTI" (DS-TTI), a "discovery signal subframe" (DS subframe), and the like. Note that the configuration of a DS-TTI is not limited to the example of FIG. 3. For example, the DS may be transmitted in any TTI in a radio frame, or may be transmitted in multiple TTIs.

In the case of FIG. 3A, in each TTI other than the DS-TTIs, a plurality of DL signals and/or UL signals (DL channels and/or UL channels) are allocated, and their transmission and reception are controlled. For example, the UE tries to receive downlink control signals (for example, L1/L2 control information) in each TTI, and, when the decoding succeeds, the UE transmits and/or receives signals in the same TTI based on the downlink control signal.

Also, in order to enable short-term communication, allocation may be performed such that transmission and reception control (scheduling) is complete within a TTI. This assignment is also referred to as "self-contained assignment." TTIs where self-contained assignment is applied may be referred to as "self-contained TTIs"

Self-contained TTIs may be referred to as "self-contained subframes" or "self-contained symbol sets," or any other designations may be applied. Also, TDD that uses self-contained subframes may be referred to as "self-contained TDD," or other designations may be used.

In one self-contained TTI, for example, a UE or an eNB transmits and/or receives downlink control information), transmits and/or receives data based on the downlink control information, and transmits and/or receives predetermined information (for example, feedback information in response to the data).

By using self-contained TTIs, it is possible to realize feedback with very low delay of one ms or less, for example, so that the conventional limitations in scheduling and HARQ feedback timing control are no longer necessary.

In the case of FIG. 3B, radio resources are semi-statically assigned based on downlink signals transmitted in DS-TTIs. For example, the UE may receive at least one of broadcast information (the MIB (Master Information Block), SIBs (System Information Blocks)), etc.) and downlink control information (DCI, etc.) in a DS-TTI, and, based on the received information, determine the radio resource allocation for predetermined TTIs other than the DS-TTI.

Hereinafter, the method of dynamically allocating predetermined physical channels/physical signals to TTIs will be described. In the following description, cases will be described in which a plurality of signals and channels are allocated to the same TTI, but the present embodiment is not limited to this. Control may be exerted so that control signals and other channels/signals are multiplexed in TTIs that are a predetermined period apart (for example, multiple TTIs, one ms, a radio frame, etc. apart).

<PRACH>

FIG. 4 shows an example of a method for dynamically controlling the random access channel (PRACH). Although FIG. 4 shows an example in which one TTI is comprised of 14 symbols (for example, 14 OFDM symbols), the present invention is not limited to this. Each TTI is preferably comprised of a number of symbols that can sufficiently secure temporal granularity (degree of freedom of in changing symbols), and, preferably, at least one or more symbols are configured for downlink control signals.

Figure 4A:
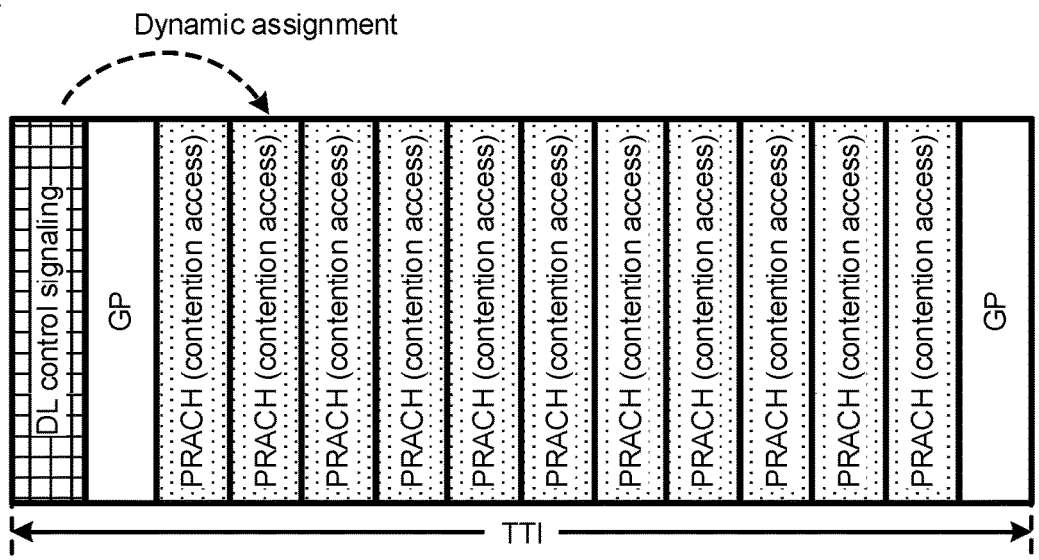
FIGS. 4A and 4B are diagrams to show an example of TTI configuration for PRACH.

The TTI shown in FIG. 4A includes a downlink control signal period (may be referred to as "allocation period," "scheduling period," "downlink control channel field," etc.), in which a downlink control signal is placed, and a PRACH transmission period in which the PRACH is allocated. The PRACH is also referred to as a "random access preamble," "message 1," "contention access channel," etc.

The downlink control information that is reported to the UE via the downlink control signal period includes information on the configuration of the TTI (for example, the length of at least one period (the length of one of the downlink control signal period, the PRACH transmission period, the feedback period, and the GP), and the amount of radio resources used in at least one period). Here, the information on the length of a period includes, for example, the first symbol of the period, the last symbol, the number of symbols, the length of the symbols, and the like. Also, it is preferable that downlink control information includes information on signal transmission and/or receiving processes (for example, modulation, demodulation, precoding, scrambling identifier, transmission power, etc.). For example, random access preamble transmission conditions can be included in downlink control information.

Further, the radio base station can transmit a downlink control signal using an ID dedicated to random access. For example, the radio base station masks (scrambles) the downlink control signal (downlink control channel) with an identifier (RA-RNTI) dedicated to random access, and transmits the downlink control signal.

The UE receives a downlink control signal for specifying the symbol location of a predetermined physical channel/physical signal period, in the downlink control signal period, and determines the TTI configuration (the TTI symbol configuration (for example, the PRACH transmission period, etc.)). That is, the UE can control PRACH transmission based on a downlink control signal.

The TTI configuration in FIG. 4A can be used as a TTI configuration to dynamically allocate the PRACH. In this configuration, the first symbol in the TTI is the downlink control signal period, the second symbol is the GP, the third to thirteenth symbols are the PRACH transmission period, and the fourteenth symbol is the GP. Of course, the number of symbols in each transmission period is not limited to these, and can be changed as appropriate.

The UE transmits the PRACH in at least a part of the PRACH transmission period (for example, in one or more symbols) based on downlink control information. Here, the PRACH may be transmitted using a randomly determined resource (non-contention-based random access), or may be transmitted using a resource that is designated by downlink control information (also referred to as "PDCCH indication," etc.) (contention-based random access).

The UE may transmit the PRACH a plurality of times (repetitious transmission) using a plurality of symbols based on downlink control information. By doing so, coverage of PRACH transmission can be secured. In this case, the user terminal may change the condition of transmission beams each time a PRACH is transmitted. Further, the radio base station having a plurality of antenna elements (in, for example, massive MIMO) can know the accurate location of a user terminal or the like by detecting a plurality of PRACHs transmitted from the UE.

Also, as shown in FIG. 4A, it is preferable that a GP is configured after the PRACH signal transmission period. This will ensure that, in the eNB, a delay margin taking into consideration differences in cell radius and so on, related to reception of the PRACH signal, can be secured.

Figure 4B:
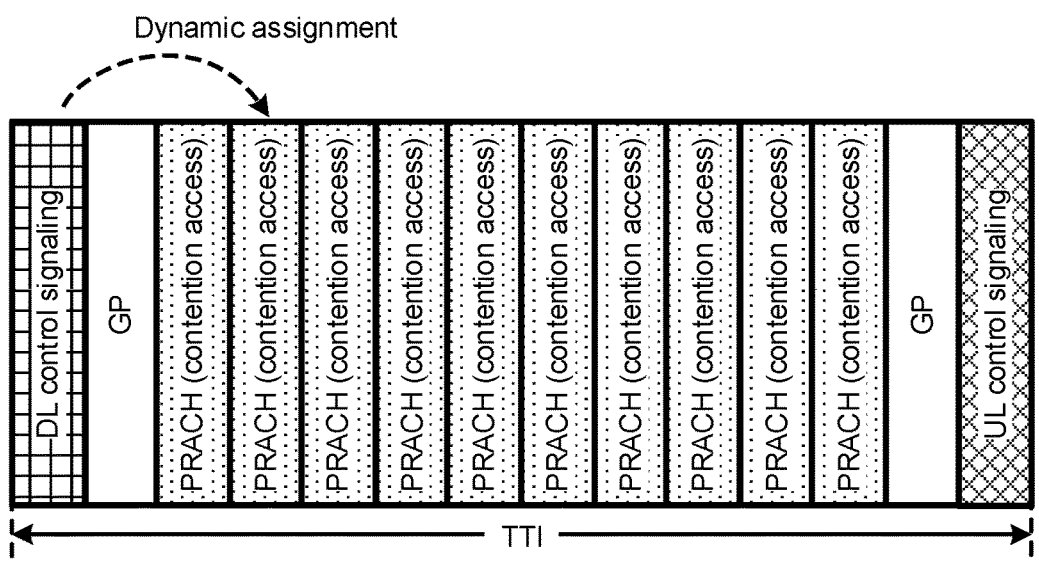

A configuration, in which a feedback period, in which a feedback signal is arranged (may be referred to as an "uplink control channel period," a "HARQ-ACK (A/N) period," a "feedback channel field," etc.) is added, in addition to the downlink control signal period and the PRACH transmission period, may be adopted (see FIG. 4B).

In the TTI configuration of FIG. 4B, the first symbol in the TTI is the downlink control signal period, the second symbol is the GP, the third to twelfth symbols are the PRACH transmission period, the thirteenth symbol is the GP, and the fourteenth symbol is the feedback period (period in which an uplink control signal is transmitted). Of course, the number of symbols forming each transmission period is not limited to these, and can be changed as appropriate.

The user terminal can transmit A/Ns, according to the reception state of downlink control signals, in the feedback period. In this manner, the delaying with A/Ns can be suppressed by configuring the PRACH transmission period and the feedback period for transmitting uplink control signals in the same TTI.

As described above, by adopting a configuration to perform PRACH transmission dynamically, it is possible to realize a radio frame configuration with excellent power saving performance.

<Broadcast Channel/Mobility RS>

FIG. 5 show examples of the method of dynamically controlling the broadcast channel (BCH) and/or the mobility reference signal. Although FIG. 5 show examples in which one TTI is comprised of 14 symbols (for example, 14 OFDM symbols), the present invention is not limited to this.

Figure 5A:
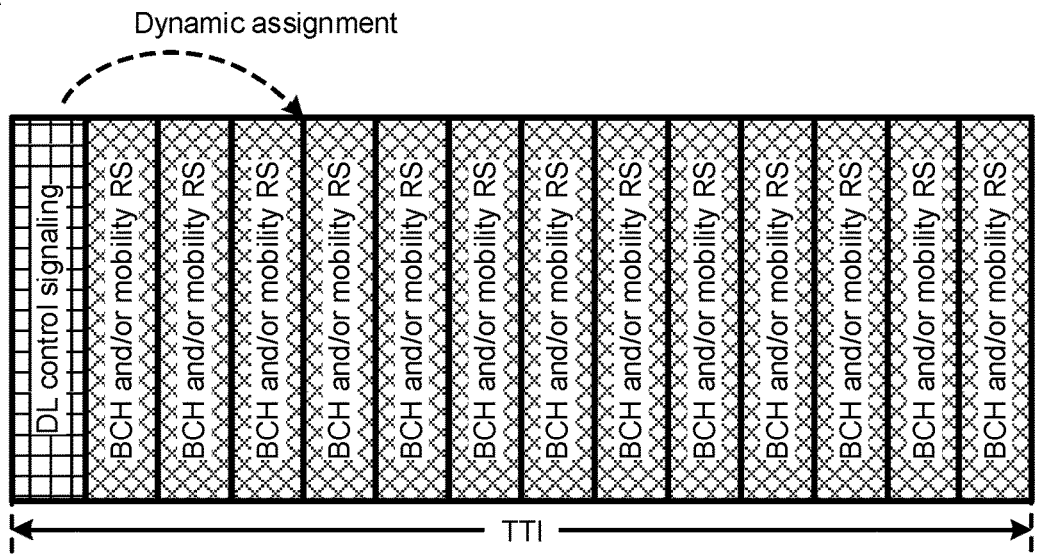
FIGS. 5A and 5B show examples of TTI configurations for BCH and/or mobility reference signals.

In the TTI shown in FIG. 5A, a downlink control signal period, in which a downlink control signal is placed (and which may be referred to as an "allocation period," a "scheduling period," a "downlink control channel field," etc.), a broadcast channel transmission period, in which a broadcast channel is allocated, and/or a mobility reference signal transmission period, in which a mobility reference signal is allocated, are included.

The mobility reference signal refers to a reference signal that is used to measure received signal power and the like, when performing mobility control such as handover and beam switching, which occurs when a user terminal moves. The mobility reference signal may be formed with any of the reference signals of existing systems (for example, the CRS, the CSI-RS, the DM-RS, the PSS/SSS, etc.), or with a combination of some or all of these. Alternatively, the mobility reference signal may be formed with a new reference signal.

The downlink control information reported to the UE via the downlink control signal period may be the same as in FIG. 4. Further, when transmitting the broadcast channel, the radio base station can transmit a downlink control signal using an ID that is dedicated to this broadcast channel. For example, the radio base station can transmit a downlink control signal (downlink control channel) by masking (scrambling) with an identifier (SI-RNTI) dedicated to the broadcast channel.

The UE receives a downlink control signal for specifying the symbol location of a predetermined physical channel/physical signal period in the downlink control signal period, and determines the TTI configuration (the broadcast channel transmission period and/or the mobility reference signal transmission period, etc.). That is, the UE can control the reception of the broadcast channel and/or the mobility reference signal based on a downlink control signal.

The TTI configuration of FIG. 5A can be used as a TTI configuration to dynamically allocate the broadcast channel and/or the mobility reference signal. In this configuration, the first symbol in the TTI is the downlink control signal period, and the second to fourteenth symbols are the broadcast channel transmission period and/or the mobility reference signal period. Of course, the number of symbols constituting each transmission period is not limited to these, and can be changed as appropriate.

The UE receives the broadcast channel and/or the mobility reference signal in at least a part of the broadcast channel transmission period (for example, one or more symbols) and/or the mobility reference signal period based on downlink control information.

The radio base station may transmit the broadcast channel and/or the mobility reference signal a plurality of times (repetitious transmission) using a plurality of symbols in the broadcast channel transmission period and/or the mobility reference signal period. With this, it is possible to secure the coverage of the broadcast channel and/or the mobility reference signal. In this case, the radio base station may change the conditions of the transmission beams of the broadcast channel and/or the mobility reference signal to be transmitted between different symbols.

Figure 5B:
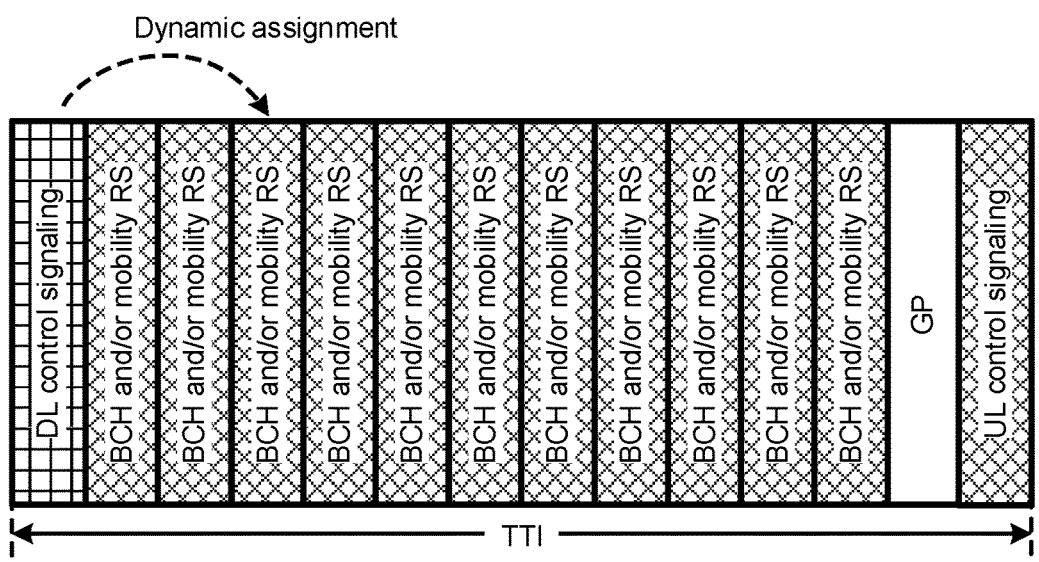

Note that a configuration, in which a feedback period, in which a feedback signal is placed, is provided, in addition to the downlink control signal period and the broadcast channel transmission period and/or the mobility reference signal period, may be adopted (see FIG. 5B).

In the TTI configuration of FIG. 5B, the first symbol in the TTI is the downlink control signal period, the second to twelfth symbols are the broadcast channel transmission period and/or the mobility reference signal period, the thirteenth symbol is the GP, and the fourteenth symbol is the feedback period (the period during which an uplink control signal is transmitted). Of course, the number of symbols constituting each transmission period is not limited to these, and can be changed as appropriate.

The user terminal can transmit A/Ns, according to the reception state of DL transmission (downlink control signals, broadcast information and/or the mobility reference signal) in the feedback period. Thus, by configuring a broadcast channel transmission period and/or a mobility reference signal period and a feedback period for transmitting uplink control signals in the same TTI, the delay of A/Ns can be suppressed.

As mentioned earlier, by using a configuration to allocate a broadcast channel and/or a mobility reference signal dynamically, it is possible to realize a radio frame configuration with excellent power saving performance.

<DL/UL Data Signal>

FIG. 6 provide diagrams to show examples of TTI configurations for DL data (self-contained TTIs). Although FIG. 6 show examples in which one TTI is comprised of 14 symbols (for example, 14 OFDM symbols), the present invention is not limited to this.

Downlink control information (for example, DCI) reported to the UE via the downlink control signal period can be configured to include information on the configuration of the TTI (for example, the length of at least one period (the length of one of the downlink control signal period, the data period, the feedback period and the GP) and the amount of radio resources used in at least one period), as in FIG. 4.

The UE receives a downlink control signal (for example, a DL grant, a UL grant, etc.) for specifying the symbol location of the data period and/or the feedback period, in the downlink control signal period, and determines the TTI configuration (TTI symbol structure).

Note that a configuration, in which part of the segments in each TTI are not subject to dynamic control, may be adopted. For example, at least a part of the information on the configuration of self-contained TTIs may be reported to the UE using higher layer signaling (for example, RRC signaling, broadcast information (the MIB (Master Information Block), SIBs (System Information Blocks), etc.)) or by a combination of these. Alternatively, a configuration may be used, in which part of the segments are used in advance on a fixed basis, and, for example, the UE and/or the eNB may perform transmission and/or receiving process based on the assumption that at least the first symbol is a downlink control signal period.

Figure 6A:
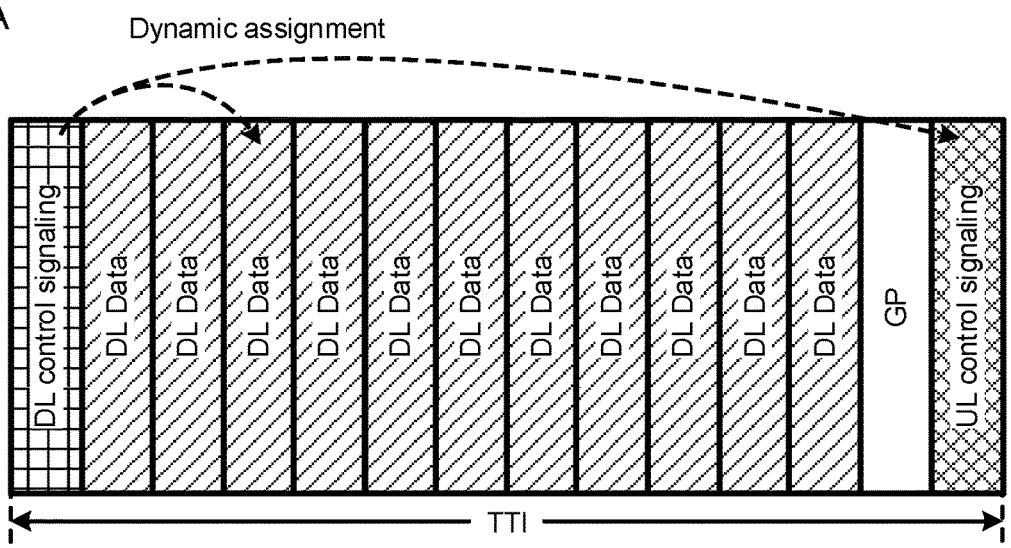
FIGS. 6A to 6C are diagrams to show examples of TTI configurations for DL data.

The TTI configuration of FIG. 6A can be used as a basic configuration for DL data TTIs. In this configuration, the first symbol in the TTI is the downlink control signal period, the second to twelfth symbols are the data period (period during which downlink data signals are received), the thirteenth symbol is the GP and the fourteenth symbol is the feedback period (the period during which uplink control signals are transmitted).

Figure 6B:
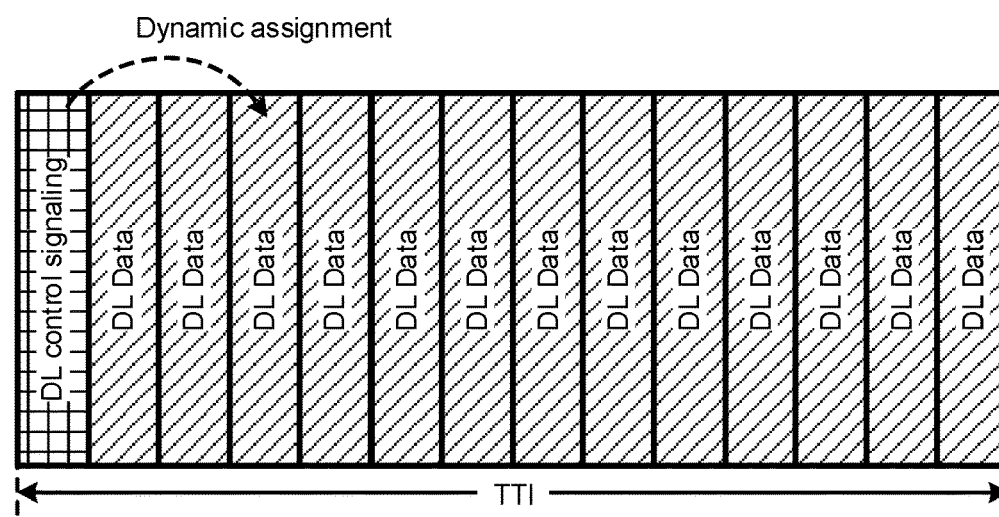

The TTI configuration of FIG. 6B can be used as a low-overhead configuration of a DL data TTI. In this configuration, the first symbol in the TTI is the downlink control signal period, and the second to fourteenth symbols are the data period.

Figure 6C:
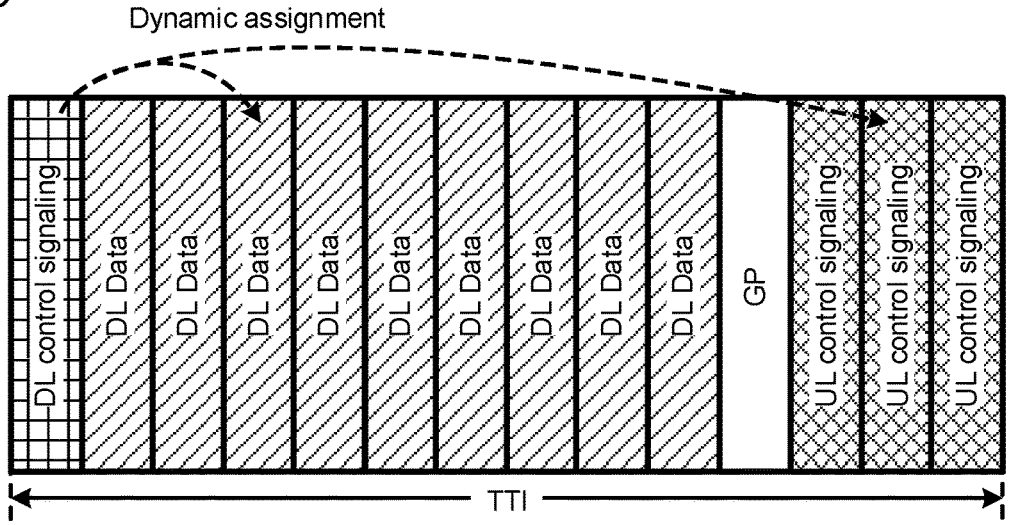

The TTI configuration of FIG. 6C can be used as feedback-focused configuration of a DL data TTI. In this configuration, the first symbol in the TTI is the downlink control signal period, the second to tenth symbols are the data period, the eleventh symbol is the GP and the twelfth to fourteenth symbols are the feedback period.

FIG. 7 provide diagrams to show examples of TTI configurations for UL data. Although FIG. 7 show examples in which one TTI is comprised of 14 symbols (for example, 14 OFDM symbols), the present invention is not limited to this.

Downlink control information that is reported to the UE via the downlink control signal period can be made the same as in FIG. 6. The UE receives a downlink control signal (for example, a UL grant) for specifying the symbol location of the data period and/or feedback period in the downlink control signal period, and determines the TTI configuration (TTI symbol structure).

Figure 7A:
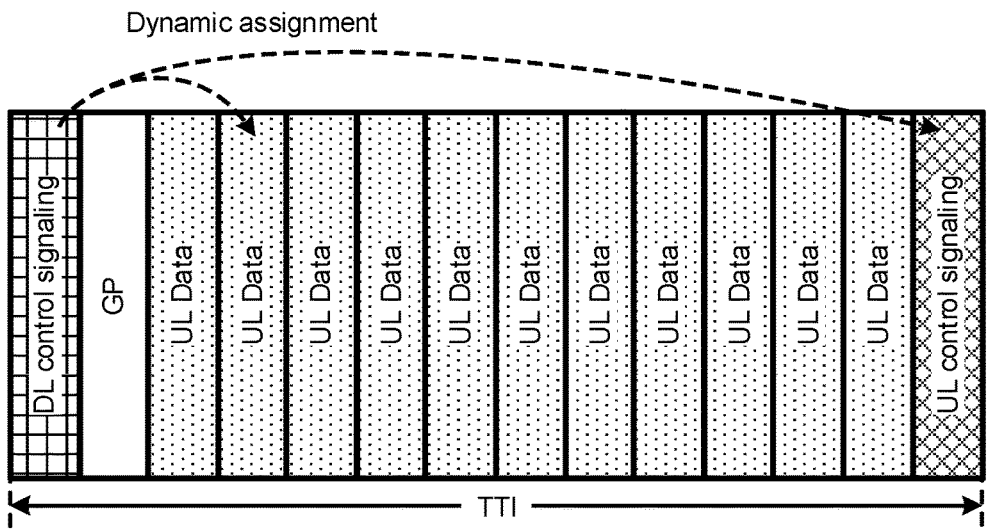
FIGS. 7A to 7C are diagrams to show examples of TTI configurations for UL data.

The TTI configuration of FIG. 7A can be used as a basic configuration for TTIs for UL data. In this configuration, the first symbol in the TTI is the downlink control signal period, the second symbol is the GP, the third to thirteenth symbols are the data period (the period for transmitting uplink data signals), the fourteenth symbol is the feedback period (the period during which uplink control signals are transmitted).

Figure 7B:
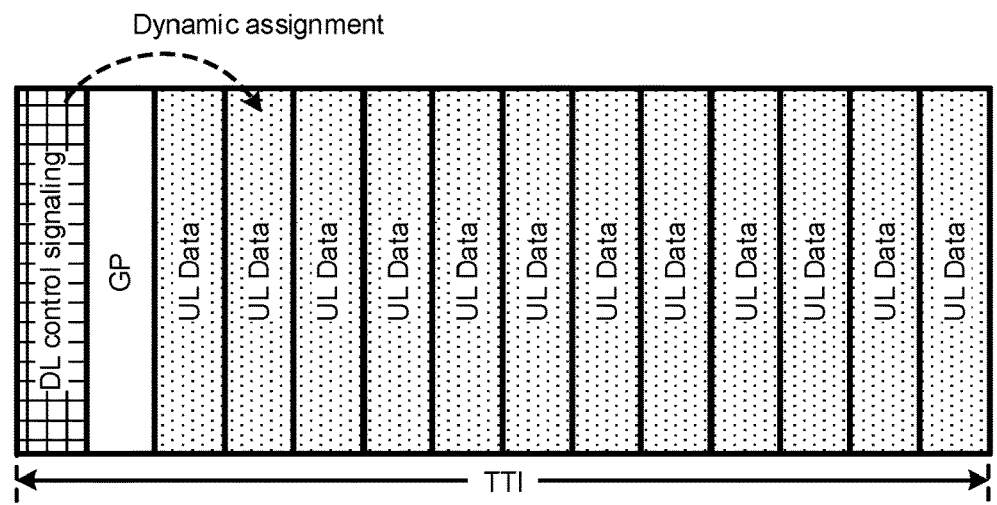

The TTI configuration of FIG. 7B can be used as a low-overhead configuration of a TTI for UL data. In this configuration, the first symbol in the TTI is the downlink control signal period, the second symbol is the GP and the third to fourteenth symbols are the data period.

Figure 7C:
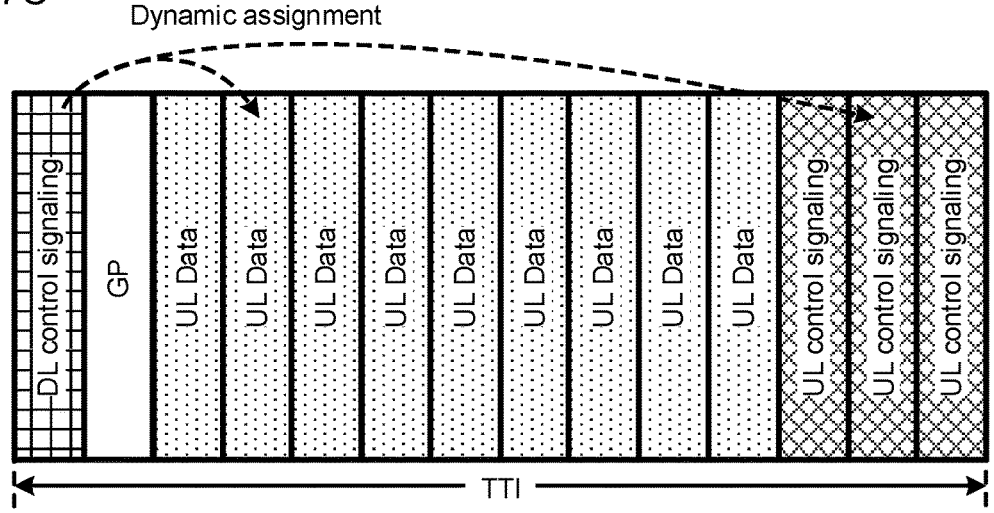

The TTI configuration of FIG. 7C can be used as feedback-focused configuration of a TTI for UL data. In this configuration, the first symbol in the TTI is the downlink control signal period, the second symbol is the GP, the third to eleventh symbols are the data period and the twelfth to fourteenth symbols are the feedback period.

In FIG. 6 and FIG. 7, the downlink control signal period for transmitting downlink control information may be comprised of a plurality of symbols (see FIG. 8).

Figure 8A:
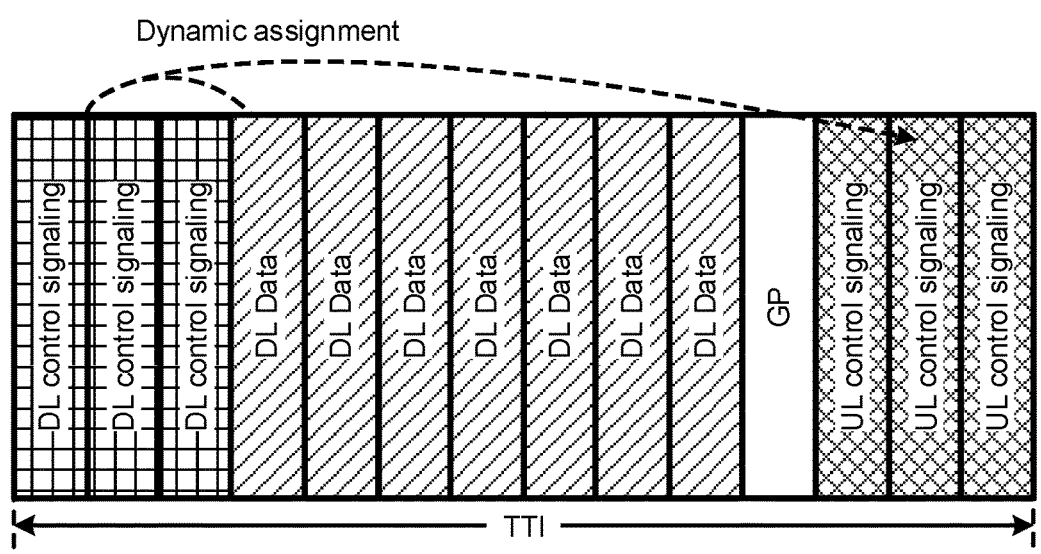
FIGS. 8A and 8B are diagrams to show other examples of a TTI configuration for DL data and a TTI configuration for UL data.
Figure 8B:
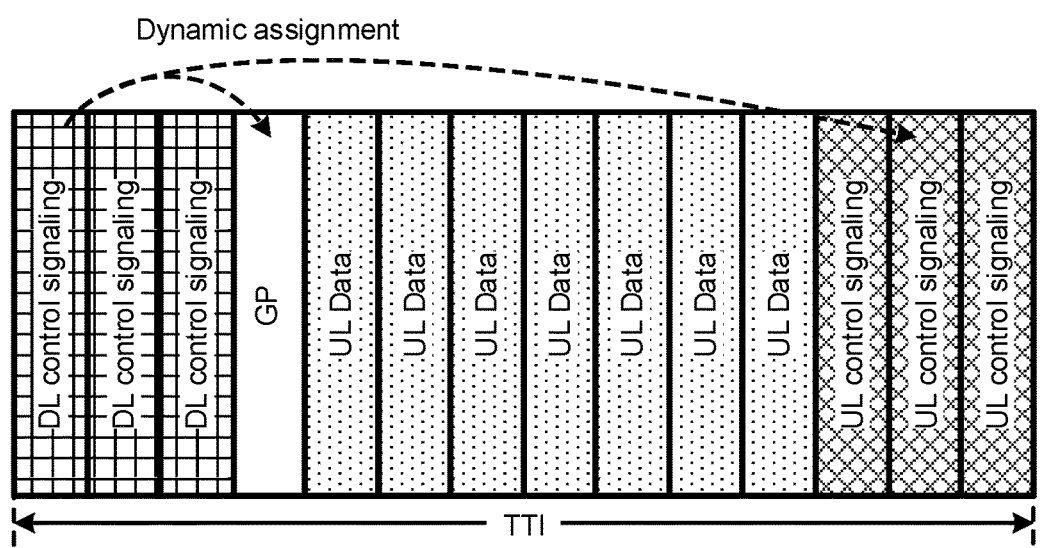

In the TTI configuration of FIG. 8A, the first to third symbols in the TTI are the downlink control signal period, the fourth to tenth symbols are the data period, the eleventh symbol is the GP, and the twelfth to fourteenth symbols are the feedback period. Also, in the TTI configuration of FIG. 8B, the first to third symbols of the TTI are the downlink control signal period, the fourth symbol is the GP, the fifth to eleventh symbols are the data period and the twelfth to fourteenth symbols are the feedback period.

Thus, a TTI configuration, in which the downlink control signal period is comprised of a plurality of symbols, can be suitably applied to transmission in which the band used is limited to a narrow band (which may be referred to as, for example, "narrowband transmission," "NB-IoT," (Narrow Band Internet of Things) "NB-LTE" (Narrow Band LTE), "NB cellular IoT" (Narrow Band cellular Internet of Things), "clean slate," etc.).

The band used by user terminals that support NB-IoT (hereinafter referred to as "NB-IoT terminals") is limited to a narrower band (for example, 180 kHz, one resource block, etc.) than the minimum system band (1.4 MHz) in existing LTE systems. In such a case, it is preferable to configure each TTI so that downlink control information can be transmitted in the time direction (using multiple symbols). As a result, even when the bandwidth to be used is limited to a narrow band, it is possible to communicate dynamically on a per TTI basis.

<DL Reference Signal>

FIG. 9 provide diagrams to show examples the method of allocating reference signals (for example, the DL DM-RS) in TTI configurations for DL data. FIG. 9 show examples in which one TTI is comprised of 14 symbols (for example, 14 OFDM symbols), but the present invention is not limited to this.

In the TTI configuration of FIG. 9, the first symbol in a TTI is the downlink control signal period, and the second to fourteenth symbols are the data period. Of course, applicable TTI configurations are not limited to these. A configuration in which a feedback period (a period during which uplink control signals are transmitted) is provided may be adopted.

Figures 9A, 9B:
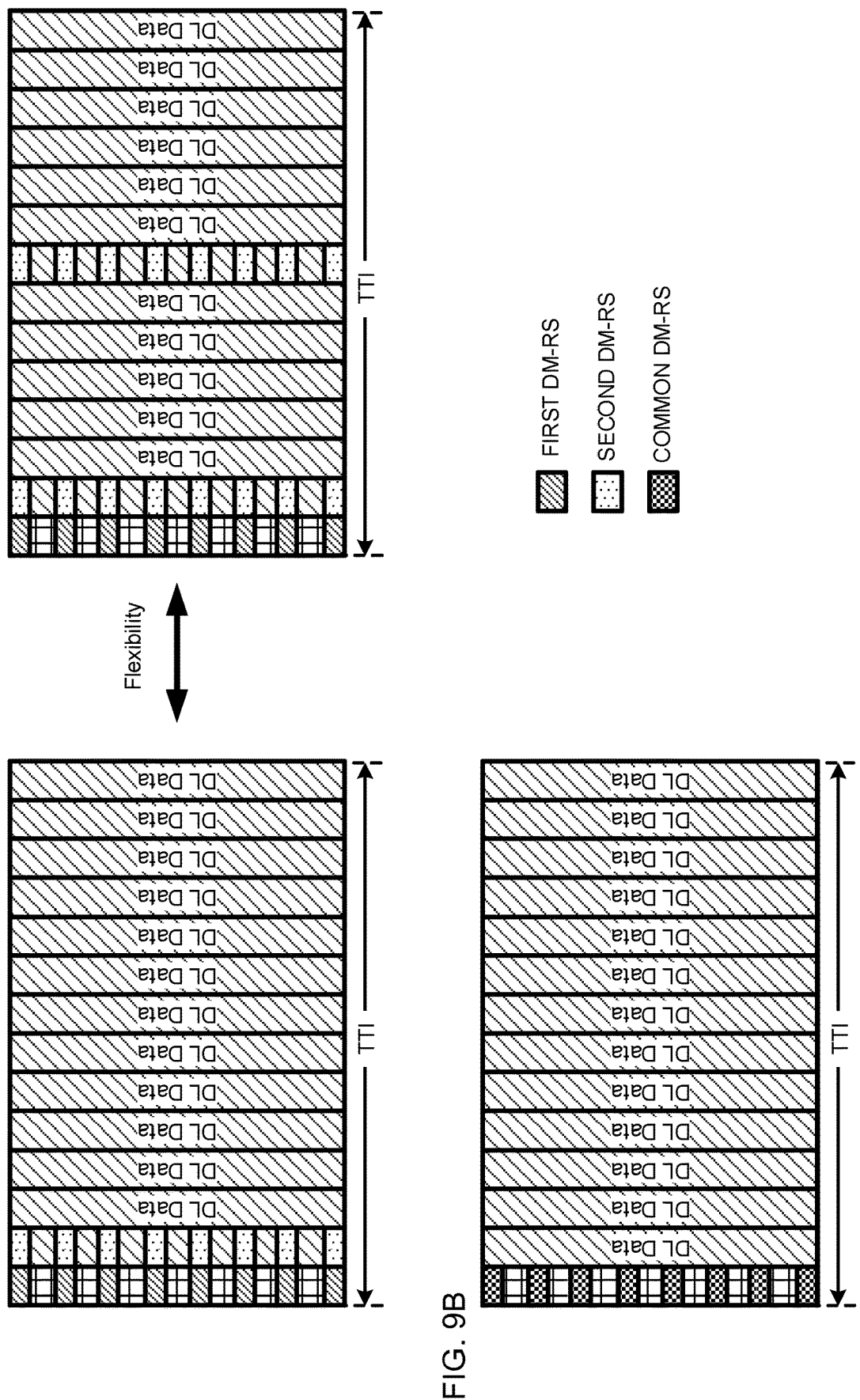
FIGS. 9A and 9B are diagrams to show examples of DL reference signal allocation methods.

FIG. 9A shows a case where a reference signal for downlink control information (first DM-RS) and a reference signal for downlink data (second DM-RS) are respectively configured. Here, a configuration in which the first DM-RS is assigned to a symbol in the downlink control signal period for transmitting downlink control information and in which the second DM-RS is allocated to a symbol in the data period for transmitting downlink data can be used.

Also, a configuration in which a reference signal is allocated to a plurality of symbols may be adopted. For example, it is possible to assign the second DM-RS to a plurality of symbols (here, the second and eighth symbols) in the data period. In this case, the UE can perform the DL data receiving process (demodulation and so on) using a plurality of second DM-RSs, so that improved received quality can be achieved. In particular, it is preferable to apply a configuration in which the second DM-RS is allocated in a plurality of symbols in the data period for a UE that moves at a speed equal to or higher than a predetermined value.

Alternatively, a configuration in which a reference signal for downlink control information and a reference signal for downlink data are configured in common may be adopted (see FIG. 9B). FIG. 9B shows a case where downlink control information and a reference signal (common DM-RS) used to demodulate downlink data are allocated in a symbol in the downlink control signal period for transmitting downlink control information.

The UE performs the receiving process of downlink control information and downlink data by using the reference signal assigned to the symbol in the downlink control signal period. In this case, the overhead of reference signals can be reduced. Further, downlink control information and the reference signal for use in the receiving process of downlink data may be configured in one or a plurality of symbols in the data period, or may be configured separately in the downlink control signal period and the data period.

In FIG. 9, another DL signal/DL channel may be applied to replace the data period. Further, the radio base station and the UE may support both the configuration of FIG. 9A and the configuration of FIG. 9B and use these configurations properly according to the communication situation (for example, according to the TTI, the type of signals/channels, etc.). For example, in the case where downlink control information and broadcast information or broadcast channel are configured in TTIs, the configuration of FIG. 9B can be applied.

<UL Reference Signal>

FIG. 10 provide diagrams to show examples of the method of allocating reference signals (for example, UL DM-RS) in TTI configurations for UL data. FIG. 10 show examples in which one TTI is comprised of 14 symbols (for example, 14 OFDM symbols), but the present invention is not limited to this.

In the TTI configuration of FIG. 10, the first symbol in a TTI is the downlink control signal period, the second symbol is the GP, the third to thirteenth symbols are the data period, and the fourteenth symbol is the feedback period. Of course, applicable TTI configurations are not limited to this.

FIG. 10A shows a case where a reference signal for downlink control information (first DM-RS), a reference signal for uplink data (second DM-RS), and a reference signal for uplink control information (third DM-RS) are respectively configured. A configuration can be adopted, in which the first DM-RS is assigned to a symbol in the downlink control signal period for transmitting downlink control information, the second DM-RS is assigned to a symbol in the data period for transmitting uplink data and the third DM-RS is assigned to the feedback period for transmitting uplink control information.

Also, a configuration in which a reference signal is allocated to a plurality of symbols may be adopted. For example, the second DM-RS can be assigned to multiple symbols (here, the third and ninth symbols) in the data period. In this case, the UE can transmit UL data using a plurality of second DM-RSs, and the radio base station can perform the receiving process (demodulation and so on) of UL data by using a plurality of second DM-RSs, so that improved received quality can be achieved. In particular, it is preferable to apply a configuration in which the second DM-RS is allocated to a plurality of symbols in the data period for a UE that moves at a speed equal to or higher than a predetermined value.

Alternatively, a configuration, in which some or all of the reference signal for uplink control information and the reference signal for uplink data are configured in common, may be used (see FIG. 10B). In FIG. 10B, a case is illustrated in which uplink control information and a common reference signal (DM-RS) for use for demodulating uplink data are allocated to a symbol in the downlink control signal period for transmitting uplink control information.

The UE performs receiving process of uplink control information and uplink data by using the common reference signal assigned to the symbol in the uplink control signal period. In addition, the UE can also perform the uplink data receiving process using the second DM-RS and the common DM-RS. As a result of this, the overhead of reference signals (second DM-RS) allocated to the data period can be reduced. Further, the common reference signal used for the receiving process of uplink control information and uplink data may be configured in the data period, or may be configured in the uplink control signal period and in the data period.

Note that, in FIG. 10, another UL signal/UL channel may be applied to replace the data period. Further, the radio base station and the UE may support both the configuration of FIG. 10A and the configuration of FIG. 10B, and use these configurations properly according to the communication situation (for example, according to the TTI, the type of signals/channels, etc.). For example, in the case where channel state information (CSI) is configured in uplink control information, the configuration of FIG. 9B can be applied.

<Other Reference Signal>

FIG. 11 provide diagrams to show examples of the method of allocating reference signals in TTI configurations for other reference signals (for example, the SRS, the CSI-RS, etc.). Although FIG. 11 shows an example in which one TTI is comprised of 14 symbols (for example, 14 OFDM symbols), the present invention is not limited to this.

Figure 11A:
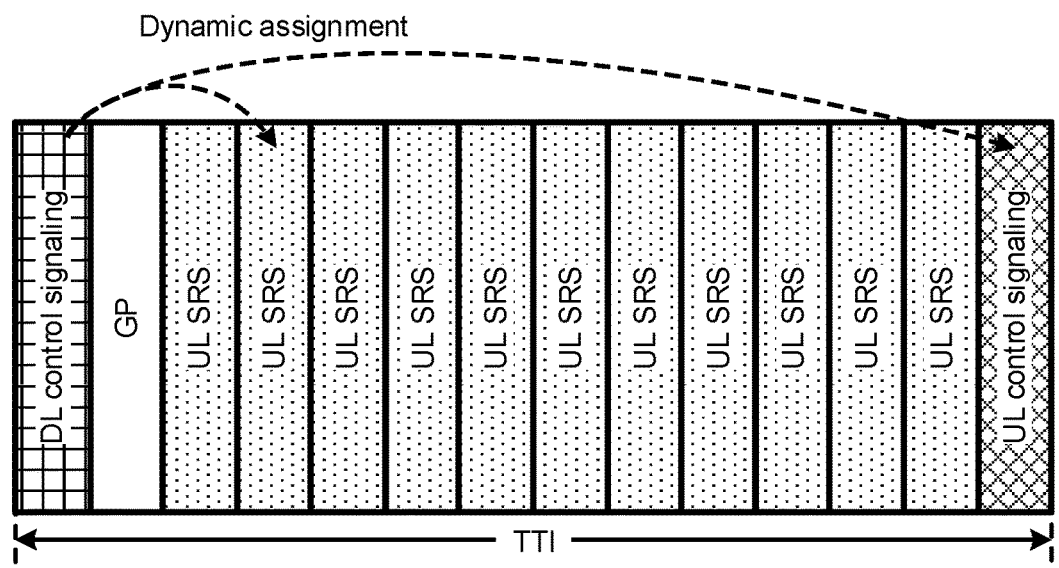
FIGS. 11A and 11B are diagrams to show examples of SRS and CSI-RS allocation methods.

The TTI configuration of FIG. 11A can be used as a TTI configuration in which an uplink measurement reference signal (SRS: Sounding Reference Signal) is dynamically allocated. In this configuration, the first symbol in the TTI is the downlink control signal period, the second symbol is the GP, the third to thirteenth symbols are the uplink SRS transmission period, and the fourteenth symbol is the feedback period. Although FIG. 11A shows a case where the feedback period is provided in the final symbol in the TTI, the order of the feedback period and the SRS transmission period may be switched.

Figure 11B:
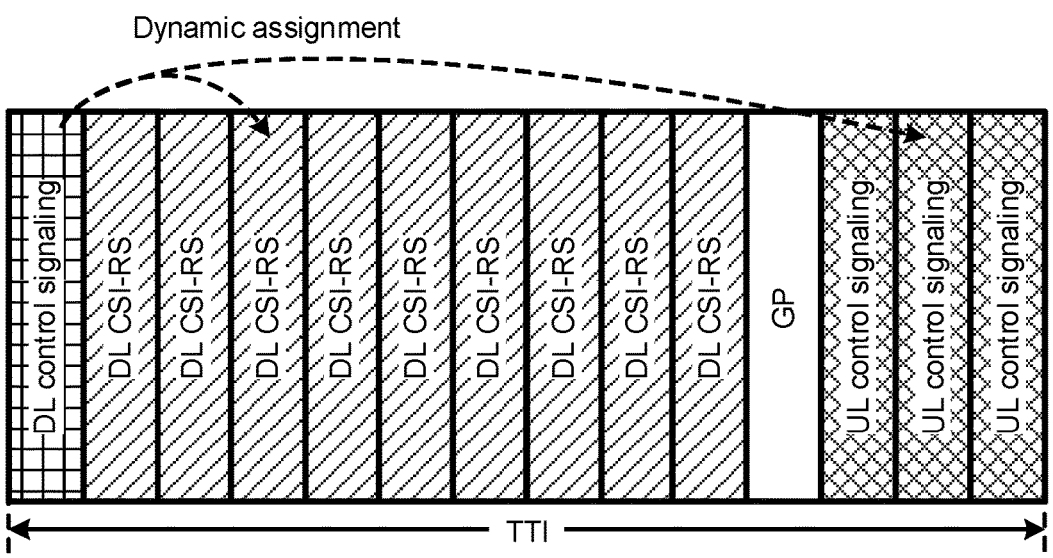

The TTI configuration in FIG. 11B can be used as a TTI configuration in which a downlink measurement reference signal (for example, the channel state information reference signal (CSI-RS)) is dynamically allocated. In this configuration, the first symbol in the TTI is the downlink control signal period, the second to tenth symbols are the downlink CSI-RS transmission period, the eleventh symbol is the GP and the twelfth to fourteenth symbol is the feedback period. This allows the UE to perform CSI measurement and reporting within one TTI (in a self-contained manner).

Although FIG. 11B shows a case where the feedback period is provided in the final symbol in the TTI, the order of the feedback period and the CSI-RS transmission period may be switched. In this case, a configuration may be employed in which CSI measurement and reporting are performed in different TTIs (for example in adjoining TTIs).

(Radio Communication System)

Now, the structure of the radio communication system according to an embodiment of the present invention will be described below. In this radio communication system, communication is performed using any one of or a combination of the radio communication methods according to the above embodiments of the present invention.

Figure 12:
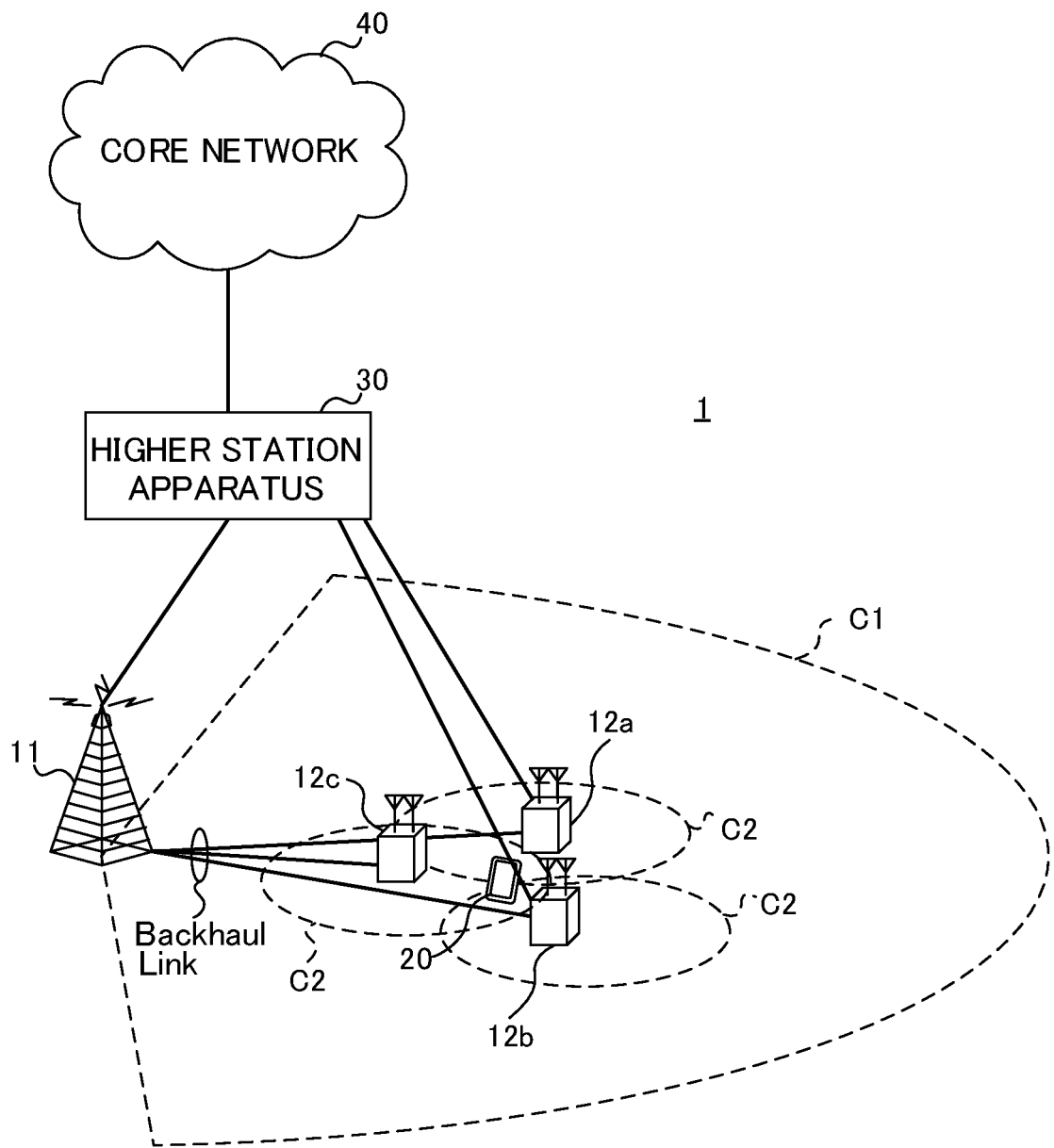
FIG. 12 is a diagram to show an example of a schematic structure of a radio communication system according to an embodiment of the present invention.

FIG. 12 is a diagram to show an example of a schematic structure of a radio communication system according to one embodiment of the present invention. The radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE" (Long Term Evolution), "LTE-A" (LTE-Advanced), "LTE-B" (LTE-Beyond), "SUPER 3G," "IMT-Advanced," "4G" (4th generation mobile communication system), "5G" (5th generation mobile communication system), "FRA" (Future Radio Access), "New-RAT" (Radio Access Technology) and so on, or may be seen as a system to implement these.

The radio communication system 1 shown in FIG. 12 includes a radio base station 11 that forms a macro cell C1, and radio base stations 12 (12a to 12c) that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2, which use different frequencies, at the same time, by means of CA or DC. Further, the user terminals 20 may apply CA or DC using a plurality of cells (CC) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the configuration of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (Home eNodeBs), "RRHs" (Remote Radio Heads), "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that, uplink and downlink radio access schemes are not limited to these combinations, and other radio access schemes may be used.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is communicated by the PCFICH. Delivery acknowledgment information (also referred to as, for example, "retransmission control information," "HARQ-ACKs," "ACK/NACKs," etc.) of HARQ (Hybrid Automatic Repeat reQuest) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgement signals and so on are communicated by the PUCCH. By means of the PRACH, random access preambles for establishing connections with cells are communicated.

In the radio communication systems 1, the cell-specific reference signal (CRS: Cell-specific Reference Signal), the channel state information reference signal (CSI-RS: Channel State Information-Reference Signal), the demodulation reference signal (DMRS: DeModulation Reference Signal), the positioning reference signal (PRS: Positioning Reference Signal) and so on are communicated as downlink reference signals. Also, in the radio communication system 1, the measurement reference signal (SRS: Sounding Reference Signal), the demodulation reference signal (DMRS) and so on are communicated as uplink reference signals. Note that, DMRSs may be referred to as "user terminal-specific reference signals" (UE-specific Reference Signals). Also, the reference signals to be communicated are by no means limited to these.

(Radio Base Station)

Figure 13:
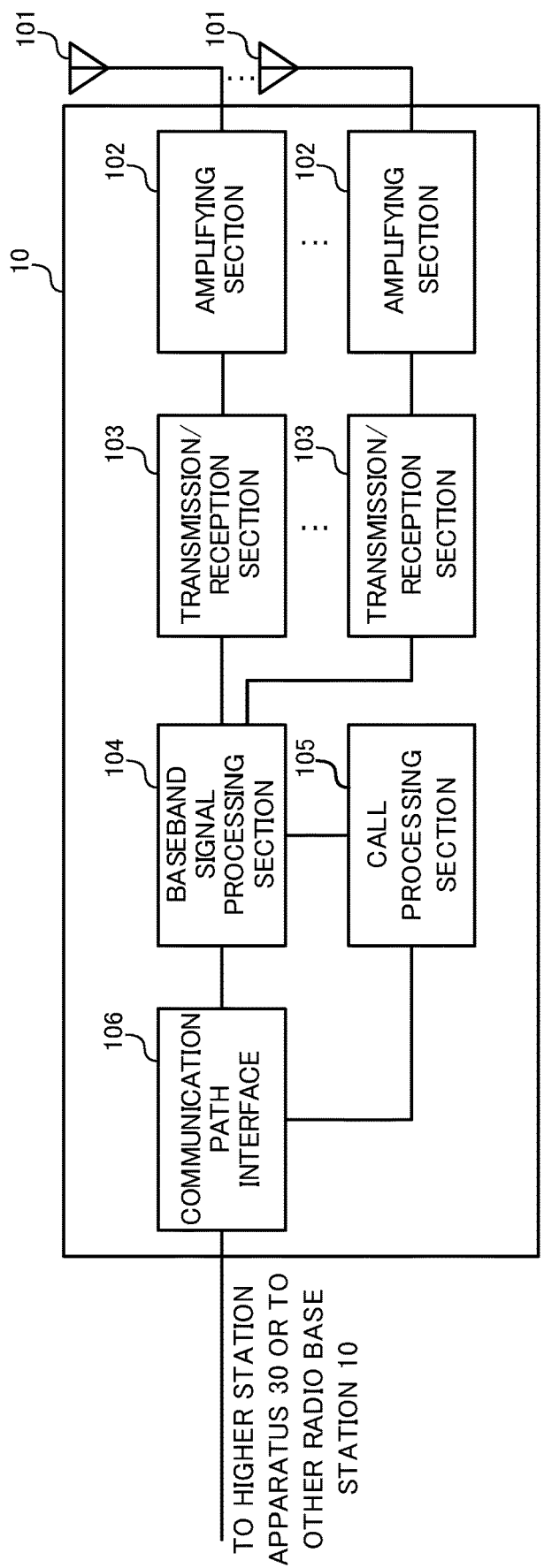
FIG. 13 is a diagram to show an example of an overall structure of a radio base station according to an embodiment of the present invention.

FIG. 13 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving sections 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving devices that can be described based on common understanding of the technical field to which the present invention pertains. Note that a transmitting/receiving section 103 may be structured as a transmitting/receiving section in one entity, or may be constituted by a transmission section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (for example, an interface in compliance with the CPRI (Common Public Radio Interface) such as optical fiber, the X2 interface, etc.).

In addition, the transmitting/receiving sections 103 transmit DCI related to data transmission and/or reception, to the user terminal 20, in a downlink control signal period determined by the control section 301. For example, the transmitting/receiving sections 103 may transmit information for commanding reception of a broadcast channel, a mobility reference signal, a downlink shared channel (PDSCH) and so on. Further, the transmitting/receiving section 103 may transmit information for commanding transmission of a random access preamble, SRS, uplink shared channel (PUSCH) so on. These DCIs may be transmitted in the same TTI, or may be transmitted in different TTIs. Further, these DCIs may be transmitted in the same frequency carrier, or may be transmitted in different frequency carriers.

The transmitting/receiving sections 103 can transmit a broadcast channel, a mobility reference signal, downlink data (PDSCH) and so on in the data period of self-contained subframes for DL data, or in DL subframes, determined by the control section 301. Further, the transmitting/receiving sections 103 transmit HARQ-ACKs in response to uplink data (PUSCH) in the delivery acknowledgment period in self-contained subframes for UL data selected by the control section 301.

Further, the transmitting/receiving sections 103 may transmit information on the TTI configuration, information on frequency resources and/or code resources where a downlink control channel is allocated, and suchlike information, to the user terminal 20.

Figure 14:
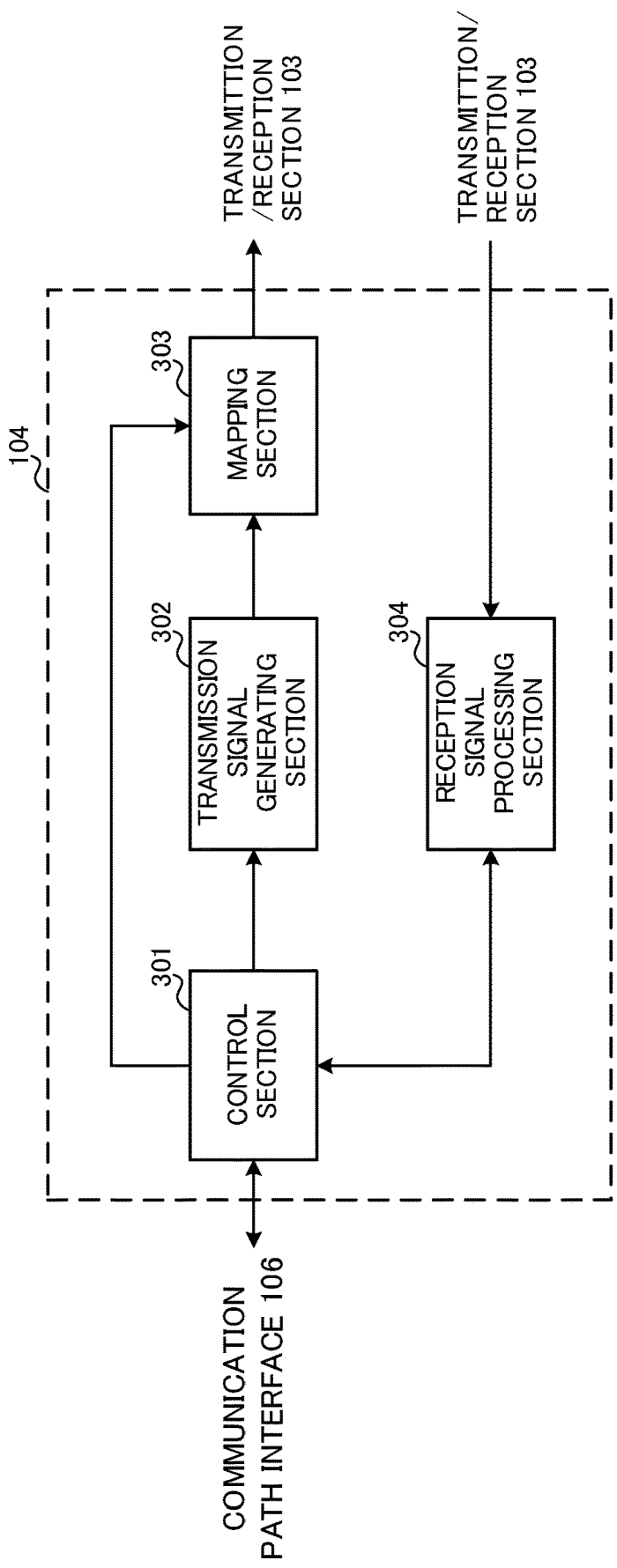
FIG. 14 is a diagram to show an example of a functional structure of a radio base station according to one embodiment of the present invention.

FIG. 14 is a diagram to show an example of a functional structure of a radio base station according to one embodiment of the present invention. Note that, although FIG. 14 primarily shows functional blocks that pertain to characteristic parts of the present embodiment, the radio base station 10 has other functional blocks that are necessary for radio communication as well. As shown in FIG. 14, the baseband signal processing section 104 has a control section (scheduler) 301, a transmission signal generating section 302, a mapping section 303, a received signal processing section 304 and a measurement section 305.

The control section (scheduler) 301 controls the whole of the radio base station 10. The control section 301 can be constituted by a controller, a control circuit or a control device that can be described based on common understanding of the technical field to which the present invention pertains.

The control section 301, for example, controls the generation of signals in the transmission signal generating section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of downlink data signals that are transmitted in the PDSCH and downlink control signals that are communicated in the PDCCH and/or the EPDCCH. The control section 301 controls the generation of downlink control signals (for example, delivery acknowledgement information and so on) and downlink data signals, based on the results of deciding whether or not retransmission control is necessary for uplink data signals, and so on. Also, the control section 301 controls the scheduling of downlink reference signals such as synchronization signals (for example, the PSS (Primary Synchronization Signal)/SSS (Secondary Synchronization Signal)), the CRS, the CSI-RS, the DM-RS and so on.

Also, the control section 301 controls the scheduling of uplink data signals transmitted in the PUSCH, uplink control signals transmitted in the PUCCH and/or the PUSCH (for example, delivery acknowledgement signals (HARQ-ACKs)), random access preambles transmitted in the PRACH, uplink reference signals and so on.

The control section 301 can control at least one of the transmission of random access preambles, the transmission of the SRS, the reception of the broadcast channel and the reception of the mobility reference signal in the user terminal 20, based on downlink control information included in the same TTI. For example, the control section 301 controls the length of each period in TTI units, and performs control so that communication is performed in accordance with each period. Note that, each period may be provided to be adjacent in time (such that, following each period, the next period starts immediately), or a non-transmission period may be further provided between each period (also referred to as a "non-reception period," a "guard period," etc.).

For example, the control section 301 can control the transmission of random access preambles in the user terminal 20 by including the random access identifier in downlink control information and reporting this to the user terminal. Further, the control section 301 can control the transmission of a plurality of broadcast channels and/or mobility reference signals using a plurality of symbols in the same TTI.

Also, when the downlink control information and another DL signal are assigned to different symbols in the same TTI, the control section 301 can control the transmission of downlink control signals and other DL signals by using different reference signals or by using a common reference signal.

The transmission signal generating section 302 generates downlink signals (downlink control signals, downlink data signals, downlink reference signals and so on) based on commands from the control section 301, and outputs these signals to the mapping section 303. The transmission signal generating section 302 can be constituted by a signal generator, a signal generating circuit or a signal generating device that can be described based on common understanding of the technical field to which the present invention pertains.

For example, the transmission signal generating section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI: Channel State Information) reported from each user terminal.

The mapping section 303 maps the downlink signals generated in the transmission signal generating section 302 to predetermined radio resources based on commands from the control section 301, and outputs these to the transmitting/receiving sections 103. The mapping section 303 can be constituted by a mapper, a mapping circuit or a mapping device that can be described based on common understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or a signal processing device that can be described based on common understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or a measurement device that can be described based on common understanding of the technical field to which the present invention pertains.

Also, by using the received signals, the received signal processing section 304 may measure the received power (for example, RSRP (Reference Signal Received Power)), the received quality (for example, RSRQ (Reference Signal Received Quality)), channel states and so on. The measurement results may be output to the control section 301.

(User Terminal)

Figure 15:
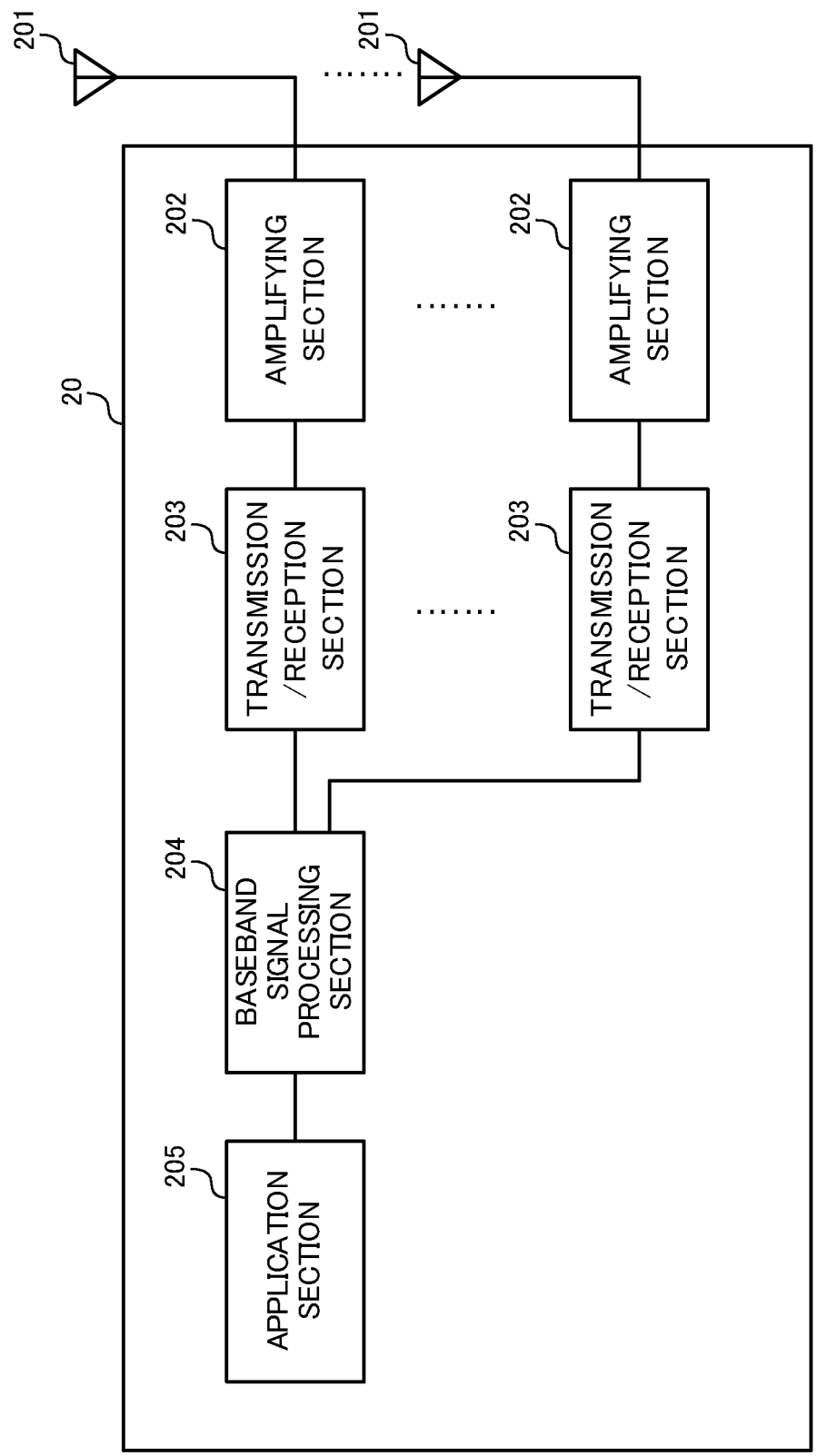
FIG. 15 is a diagram to show an example of an overall structure of a user terminal according to an embodiment of the present invention.

FIG. 15 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that at least one transmitting/receiving antenna 201, amplifying section 202 and transmitting/receiving section 203 has only to be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. The transmitting/receiving sections 203 can be constituted by transmitters/receivers, transmitting/receiving circuits or transmitting/receiving devices that can be described based on common understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to the transmitting/receiving section 203. The baseband signal that is output from the baseband signal processing section 204 is converted into a radio frequency bandwidth in the transmitting/receiving sections 203. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 receive DL signals and transmit UL signals. For example, the transmitting/receiving sections 203 transmit the random access preamble, transmit the SRS, receive the broadcast channel, and receive the mobility reference signal.

Figure 16:
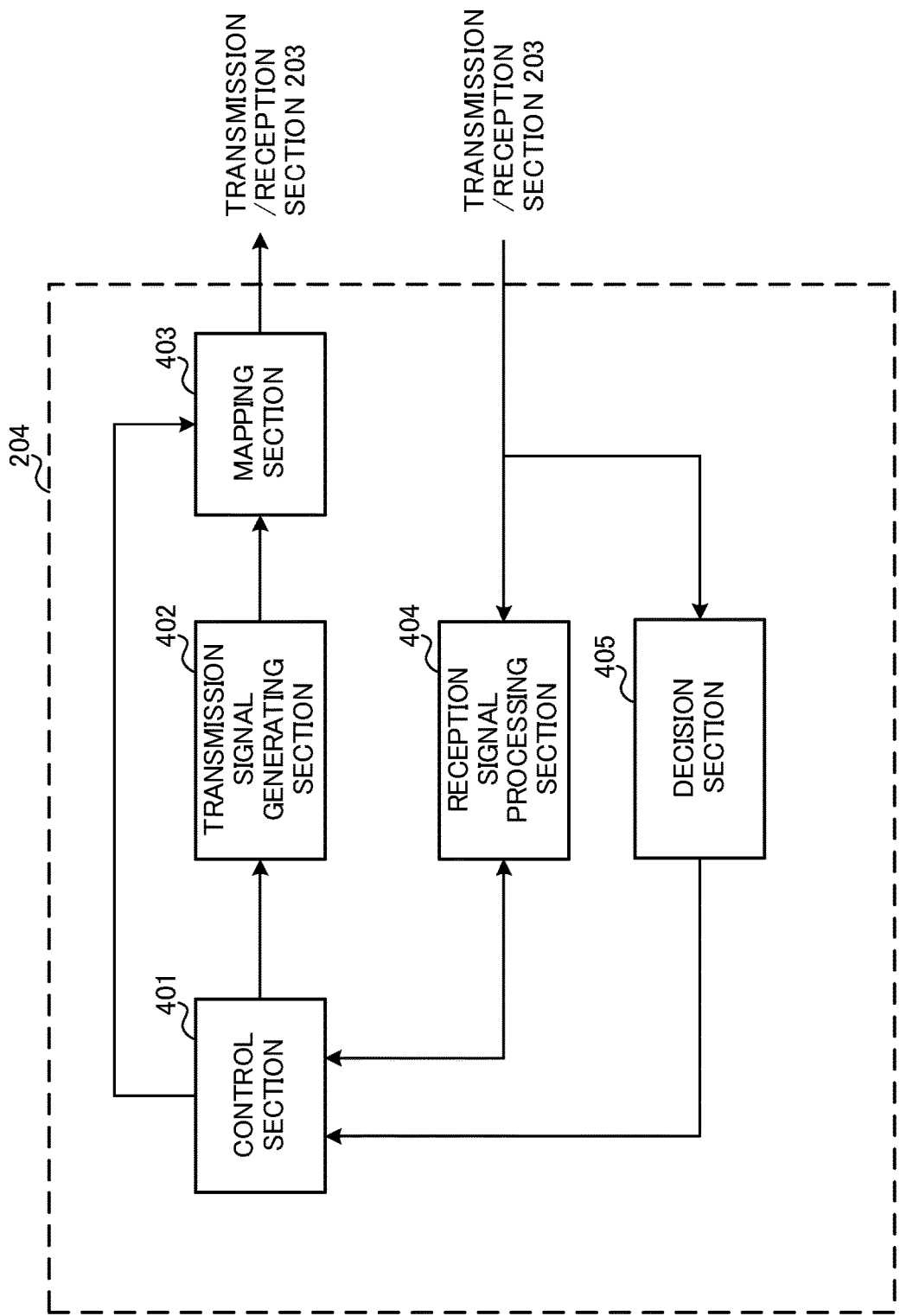
FIG. 16 is a diagram to show an example of a functional structure of a user terminal according to an embodiment of the present invention.

FIG. 16 is a diagram to show an example of a functional structure of a user terminal according to one embodiment of the present invention. Note that, although FIG. 16 primarily shows functional blocks that pertain to characteristic parts of the present embodiment, the user terminal 20 has other functional blocks that are necessary for radio communication as well. As shown in FIG. 16, the baseband signal processing section 204 provided in the user terminal 20 at least has a control section 401, a transmission signal generating section 402, a mapping section 403, a received signal processing section 404 and a measurement section 405.

The control section 401 controls the whole of the user terminal 20. For the control section 401, a controller, a control circuit or a control device that can be described based on common understanding of the technical field to which the present invention pertains can be used.

The control section 401, for example, controls the generation of signals in the transmission signal generating section 402, the allocation of signals by the mapping section 403, and so on. Furthermore, the control section 401 controls the signal receiving processes in the received signal processing section 404, the measurements of signals in the measurement section 405, and so on.

The control section 401 acquires downlink control signals (signals transmitted in the PDCCH/EPDCCH) and downlink data signals (signals transmitted in the PDSCH) transmitted from the radio base station 10, from the received signal processing section 404. The control section 401 controls the generation of uplink control signals (for example, delivery acknowledgement signals and so on) and uplink data signals, based on the downlink control signals, the results of deciding whether or not retransmission control is necessary for the downlink data signals, and so on.

The control section 401 dynamically or semi-dynamically controls at least one of transmission of random access preambles, transmission of the SRS, reception of the broadcast channel, and reception of the mobility reference signal. For example, the control section 401 can control these signals based on downlink control information included in the same TTI. Alternatively, the control section 401 may control the transmission of the random access preamble, the transmission of the SRS, the reception of the broadcast channel, the reception of the mobility reference signal, and the like, based on downlink control information that is allocated in TTIs that are a predetermined period apart.

Further, the control section 401 may transmit uplink control information in TTIs for performing at least one of transmission of random access preambles, transmission of the SRS, reception of a broadcast channel, and reception of a mobility reference signal. Further, the control section 401 can control transmission of a plurality of random access preambles by using a plurality of symbols in the same TTI (see FIG. 4). Further, the control section 401 can control reception of a plurality of broadcast channels and/or reception of mobility reference signals by using a plurality of symbols in the same TTI (see FIG. 5).

When downlink control information and other DL signals are allocated in different symbols in the same TTI, the control section 401 can control the reception of the downlink control signal and the reception of the other DL signals by using different reference signals (see FIG. 9). Alternatively, the control section 401 may control the reception of the downlink control signal and the reception of other DL signals by using a common reference signal.

When uplink data (or other UL signals) and uplink control information are assigned to different symbols in the same TTI, the control section 401 can control the transmission of the uplink data and the transmission of the uplink control information using different reference signals (see FIG. 10). Alternatively, the control section 401 may control the transmission of uplink data and the transmission of uplink control information using a common reference signal.

The transmission signal generating section 402 generates uplink signals (uplink control signals, uplink data signals, uplink reference signals and so on) based on commands from the control section 401, and outputs these signals to the mapping section 403. The transmission signal generating section 402 can be constituted by a signal generator, a signal generating circuit or a signal generating device that can be described based on common understanding of the technical field to which the present invention pertains.

For example, the transmission information generating section 402 generates uplink control signals such as delivery acknowledgement signals (HARQ-ACKs), channel state information (CSI) and so on, based on commands from the control section 401. Also, the transmission signal generating section 402 generates uplink data signals based on commands from the control section 401. For example, when a UL grant is included in a downlink control signal that is reported from the radio base station 10, the control section 401 commands the transmission signal generating section 402 to generate an uplink data signal.

The mapping section 403 maps the uplink signals generated in the transmission signal generating section 402 to radio resources based on commands from the control section 401, and output the result to the transmitting/receiving sections 203. The mapping section 403 can be constituted by a mapper, a mapping circuit or a mapping device that can be described based on common understanding of the technical field to which the present invention pertains.

The received signal processing section 404 performs receiving processes (for example, demapping, demodulation, decoding and so on) of received signals that are input from the transmitting/receiving section 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or a signal processing device that can be described based on common understanding of the technical field to which the present invention pertains. Also, the received signal processing section 404 can constitute the receiving section according to the present invention.

The received signal processing unit 404 performs blind decoding on the DCI (DCI format) for scheduling transmission and/or reception of data (TB: Transport Block) based on commands from the control section 401. For example, the received signal processing section 404 may be configured to blind-decode different radio resources based on whether or not the subframe is a self-contained subframe.

The received signal processing section 404 output the decoded information that is acquired through the receiving processes to the control section 401. The received signal processing section 404 outputs, for example, broadcast information, system information, RRC signaling, DCI and so on, to the control section 401. The received signal processing section 404 may output the decoding result of data to the control section 401. Also, the received signal processing section 404 outputs the received signals, the signals after the receiving processes and so on to the measurement section 405.

The measurement section 405 conducts measurements with respect to the received signals. The measurement section 405 can be constituted by a measurer, a measurement circuit or a measurement device that can be described based on common understanding of the technical field to which the present invention pertains.

The measurement section 405 may measure, for example, the received power (for example, RSRP), the received quality (for example, RSRQ), the channel states and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be implemented with one physically-integrated device, or may be implemented by connecting two physically-separate devices via radio or wire and by using these multiple devices.

Figure 17:
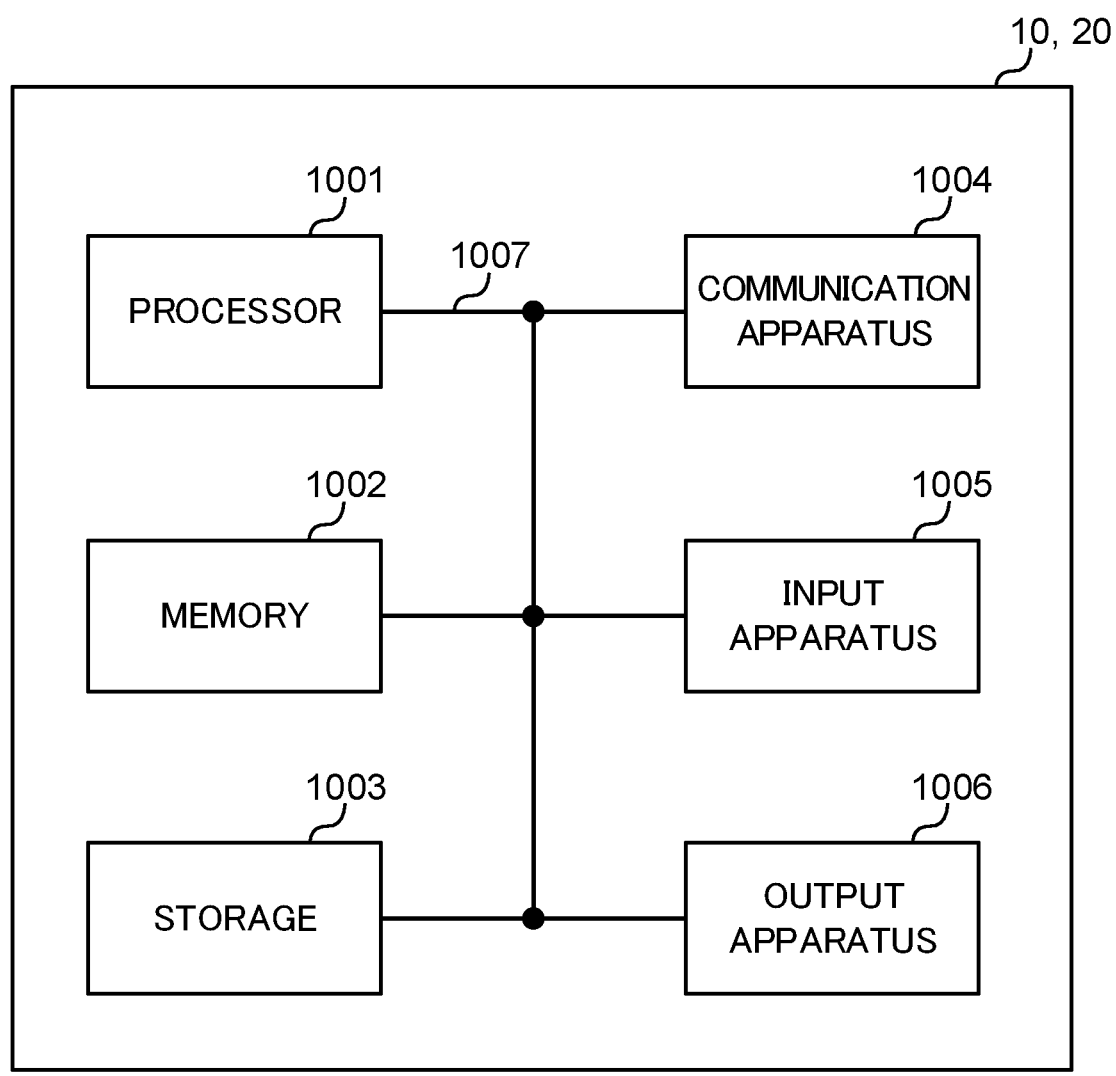
FIG. 17 is a diagram to show an example hardware structure of a radio base station and a user terminal according to an embodiment of the present invention.

That is, the radio base stations, user terminals and so according to embodiments of the present invention may function as a computer that executes the processes of the radio communication method of the present invention. FIG. 17 is a diagram to show an example hardware structure of a radio base station and a user terminal according to an embodiment of the present invention. Physically, a radio base station 10 and a user terminal 20, which have been described above, may be formed as a computer apparatus that includes a processor 1001, a memory 1002, a storage 1003, a communication apparatus 1004, an input apparatus 1005, an output apparatus 1006 and a bus 1007.

Note that, in the following description, the word "apparatus" may be replaced by "circuit," "device," "unit" and so on. Note that the hardware structure of the radio base station 10 and the user terminal 20 may be designed to include one or more of each apparatus shown in the drawings, or may be designed not to include part of the apparatuses.

Each function of the radio base station 10 and the user terminal 20 is implemented by reading predetermined software (programs) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU) including an interface with a peripheral device, a control device, a computing device, a register, and the like. For example, the above-described baseband signal process section 104 (204), call processing section 105 and so on may be implemented by the central processing apparatus 1001.

Further, the processor 1001 reads a program (program code), a software module or data from the storage 1003 and/or the communication device 1004 to the memory 1002, and executes various processes according to these. As for the programs, programs to allow the computer to execute at least part of the operations of the above-described embodiments may be used. For example, the control section 401 of the user terminals 20 may be stored in the memory 1002 and implemented by a control program that operates on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), a RAM (Random Access Memory) and so on. The memory 1002 may be referred to as a "register," a "cache," a "main memory" (primary storage apparatus) or the like. The memory 1002 can store executable programs (program codes), software modules, and the like for implementing the radio communication methods according to embodiments of the present invention.

The storage 1003 is a computer readable recording medium, and is configured with at least one of an optical disk such as a CD-ROM (Compact Disc ROM), a hard disk drive, a flexible disk, a magneto-optical disk, a flash memory and so on. The storage 1003 may be referred to as a "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, etc.). The output apparatus 1006 is an output device for allowing sending output to the outside (for example, a display, a speaker, etc.). Note that the input apparatus 1005 and the output apparatus 1006 may be provided in an integrated structure (for example, a touch panel).

Further, the respective devices such as the processor 1001 and the memory 1002 are connected by a bus 1007 for communicating information. The bus 1007 may be formed with a single bus, or may be formed with buses that vary between the apparatuses.

For example, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these hardware.

Note that the terminology used in this description and the terminology that is needed to understand this description may be replaced by other terms that convey the same or similar meanings. For example, "channels" and/or "symbols" may be replaced by "signals" (or "signaling"). Also, "signals" may be "messages." Furthermore, "component carriers" (CCs) may be referred to as "cells," "frequency carriers," "carrier frequencies" and so on.

Further, a radio frame may be comprised of one or more periods (frames) in the time domain. Each of one or more periods (frames) constituting a radio frame may be referred to as a "subframe." Further, a subframe may be comprised of one or more slots in the time domain. Further, a slot may be comprised of one or more symbols (OFDM symbols, SC-FDMA symbols, etc.) in the time domain.

A radio frame, a subframe, a slot and a symbol all represent the time unit in signal communication. Radio frames, subframes, slots and symbols may be called by other names. For example, one subframe may be referred to as a "transmission time interval" (TTI), or a plurality of consecutive subframes may be referred to as a "TTI," and one slot may be referred to as a "TTI." That is, a subframe and a TTI may be a subframe (one ms) in existing LTE, may be a shorter period than one ms (for example, 1 to 13 symbols), or may be a longer period of time than one ms.

Here, a TTI refers to the minimum time unit of scheduling in wireless communication, for example. For example, in LTE systems, the radio base station schedules the allocation radio resources (such as the frequency bandwidth and transmission power that can be used by each user terminal) to each user terminal in TTI units. The definition of TTIs is not limited to this.

A TTI having a time duration of one ms may be referred to as a "normal TTI" (TTI in LTE Rel. 8 to 12), a "long TTI," a "normal subframe," a "long subframe," etc. A TTI that is shorter than a normal TTI may be referred to as a "shortened TTI," a "short TTI," a "shortened subframe," a "short subframe," or the like.

A resource block (RB) is a resource allocation unit in the time domain and the frequency domain, and may include one or a plurality of consecutive subcarriers in the frequency domain. Also, an RB may include one or more symbols in the time domain and may be one slot, one subframe or one TTI in length. One TTI and one subframe each may be comprised of one or more resource blocks. Note that an RB may be referred to as a "physical resource block" (PRB: Physical RB), a "PRB pair," an "RB pair," or the like.

Further, a resource block may be comprised of one or more resource elements (REs). For example, one RE may be a radio resource field of one subcarrier and one symbol.

Note that the structures of radio frames, subframes, slots, symbols and the like described above are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) length can be variously changed.

Also, the information and parameters described in this description may be represented in absolute values or in relative values with respect to a predetermined value, or may be represented in other information formats. For example, radio resources may be specified by predetermined indices.

The information, signals and/or others described in this description may be represented by using a variety of different technologies. For example, data, instructions, commands, information, signals, bits, symbols and chips, all of which may be referenced throughout the description, may be represented by voltages, currents, electromagnetic waves, magnetic fields or particles, optical fields or photons, or any combination of these.

Also, software and commands may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation and microwaves), these wired technologies and/or wireless technologies are also included in the definition of communication media.

Further, the radio base station in this specification may be read by a user terminal. For example, each aspect/embodiment of the present invention may be applied to a configuration in which communication between a radio base station and a user terminal is replaced with communication of a plurality of user terminals (D2D: Device-to-Device). In this case, the user terminal 20 may have the functions of the radio base station 10 described above. In addition, wording such as "uplink" and "downlink" may be interpreted as "side." For example, an uplink channel may be interpreted as a side channel.

Likewise, a user terminal in this specification may be interpreted as a radio base station. In this case, the radio base station 10 may have the functions of the user terminal 20 described above.

The example s/embodiments illustrated in this description may be used individually or in combinations, and the mode of may be switched depending on the implementation. Also, a report of predetermined information (for example, a report to the effect that "X holds") does not necessarily have to be sent explicitly, and can be sent implicitly (by, for example, not reporting this piece of information).

Reporting of information is by no means limited to the example s/embodiments described in this description, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, broadcast information (the MIB (Master Information Blocks) and SIBs (System Information Blocks) and so on) and MAC (Medium Access Control) signaling, other signals or combinations of these. Also, RRC signaling may be referred to as "RRC messages," and can be, for example, an RRC connection setup message, RRC connection reconfiguration message, and so on. Also, the MAC signaling may be reported, for example, by a MAC control element (MAC CE (Control Element)).

Also, RRC signaling may be referred to as "RRC messages," and can be, for example, an RRC connection setup message, RRC connection reconfiguration message, and so on. Also, the MAC signaling may be reported, for example, by a MAC control element (MAC CE (Control Element)).

The examples/embodiments illustrated in this description may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other adequate systems, and/or next-generation systems that are enhanced based on these.

The order of processes, sequences, flowcharts and so on that have been used to describe the examples/embodiments herein may be re-ordered as long as inconsistencies do not arise. For example, although various methods have been illustrated in this description with various components of steps in exemplary orders, the specific orders that illustrated herein are by no means limiting.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining example s, and should by no means be construed to limit the present invention in any way.

The disclosure of Japanese Patent Application No. 2016-038175, filed on Feb. 29, 2016, including the specification, drawings and abstract, is incorporated herein by reference in its entirety

The invention claimed is:

1. A terminal comprising:
a receiver that receives downlink control information that is used for scheduling of a downlink shared channel; and
a processor that determines an assignment symbol location of the downlink shared channel based on the downlink control information, and a transmission timing of a delivery acknowledgement signal for the downlink shared channel based on the downlink control information,
wherein reception of the downlink control information and transmission of the delivery acknowledgement signal are allowed within a slot.

2. The terminal according to claim 1, wherein the processor determines a symbol location of an uplink control channel used for transmission of the delivery acknowledgement signal based on the downlink control information.

3. A terminal comprising:
a receiver that receives downlink control information including information about channel state information (CSI); and
a processor that determines assignment of a CSI reference signal based on the downlink control information, and a transmission timing of the CSI based on the downlink control information.

4. The terminal according to claim 3, wherein the processor determines a symbol location of an uplink control channel that is used for transmission of the CSI based on the downlink control information.

5. A radio communication method for a terminal, comprising:
receiving downlink control information that is used for scheduling of a downlink shared channel; and
determining an assignment symbol location of the downlink shared channel based on the downlink control information, and a transmission timing of a delivery acknowledgement signal for the downlink shared channel based on the downlink control information,
wherein reception of the downlink control information and transmission of the delivery acknowledgement signal are allowed within a slot.

6. A radio communication method for a terminal, comprising:
receiving downlink control information including information about channel state information (CSI); and
determining assignment of a CSI reference signal based on the downlink control information, and a transmission timing of the CSI based on the downlink control information.

7. A base station comprising:
a transmitter that transmits downlink control information that is used for scheduling of a downlink shared channel; and
a processor that controls to indicate an assignment symbol location of the downlink shared channel by using the downlink control information, and a reception timing of a delivery acknowledgement signal for the downlink shared channel by using the downlink control information,
wherein transmission of the downlink control information and reception of the delivery acknowledgement signal are allowed within a slot.

8. A base station comprising:
a transmitter that transmits downlink control information including information about channel state information (CSI); and
a processor that controls to indicate an assignment of a CSI reference signal by using the downlink control information, and a reception timing of the CSI by using the downlink control information.

* * * * *